(12) United States Patent
Nakajima et al.

(10) Patent No.: US 7,201,257 B2
(45) Date of Patent: Apr. 10, 2007

(54) DISK BRAKE DEVICES

(75) Inventors: Masahiko Nakajima, Kariya (JP);
Yoshiki Matsuzaki, Kariya (JP)

(73) Assignee: Advics Co., Ltd., Kariya-Shi, Aichi-Ken (JP)

(*) Notice: Subject to any disclaimer, the term of this patent is extended or adjusted under 35 U.S.C. 154(b) by 0 days.

(21) Appl. No.: 10/963,562

(22) Filed: Oct. 14, 2004

(65) Prior Publication Data

US 2005/0115779 A1 Jun. 2, 2005

(30) Foreign Application Priority Data

Oct. 14, 2003 (JP) ............................. 2003-353693
Oct. 20, 2003 (JP) ............................. 2003-359729
Nov. 7, 2003 (JP) ............................. 2003-378316

(51) Int. Cl.
F16D 65/40 (2006.01)
F16D 55/00 (2006.01)

(52) U.S. Cl. ................... 188/73.38; 188/73.31

(58) Field of Classification Search ............... 188/72.3, 188/73.31, 73.37, 73.38, 73.39, 73.43, 73.35, 188/73.36
See application file for complete search history.

(56) References Cited

U.S. PATENT DOCUMENTS

| 4,371,060 | A | * | 2/1983 | Iwata | ..................... | 188/73.38 |
|---|---|---|---|---|---|---|
| 4,512,446 | A | * | 4/1985 | Chuwman et al. | ....... | 188/73.38 |
| 5,377,790 | A | * | 1/1995 | Tsuruta | ..................... | 188/73.38 |
| 5,381,875 | A | * | 1/1995 | Tsuruta et al. | ........... | 188/73.38 |
| 5,577,577 | A | * | 11/1996 | Hirai et al. | .............. | 188/73.38 |
| 5,649,610 | A | * | 7/1997 | Shimazaki et al. | ...... | 188/73.38 |
| 6,003,642 | A | * | 12/1999 | Mori et al. | .............. | 188/73.37 |
| 6,296,085 | B1 | | 10/2001 | Yukoku | | |
| 2004/0016610 | A1 | * | 1/2004 | Morris | ..................... | 188/73.31 |
| 2005/0236236 | A1 | * | 10/2005 | Farooq | ..................... | 188/73.31 |

FOREIGN PATENT DOCUMENTS

| JP | 5-10832 | 2/1993 |
|---|---|---|
| JP | 6-62232 | 9/1994 |
| JP | 2000-27905 | 1/2000 |

* cited by examiner

*Primary Examiner*—Thomas Williams
(74) *Attorney, Agent, or Firm*—Buchanan Ingersoll & Rooney PC

(57) ABSTRACT

A disk brake device has a rotary brake disk, at least one pad, and a mount. The pad has a guide portion disposed on one end of the pad in the rotational direction of the brake disk. The mount has a support portion that slidably supports the guide portion, so that the pad can move in the axial direction of the brake. A radially outer pressure receiving surface and a radially inner pressure receiving surface are formed on an end of the pad in the rotational direction of the brake disk and serve to receive a reaction force from the mount in order to prevent the pad from moving in the rotational direction of the brake disk. A support member serves to bias the pad in an axial and rotational direction so as to reduce the production of audible sounds.

14 Claims, 17 Drawing Sheets

DISK BRAKE DEVICES

This application claims priority to Japanese patent application serial numbers 2003-353693, 359729 and 378316, the contents of which are incorporated herein by reference.

BACKGROUND OF THE INVENTION

1. Field of the Invention

The present invention relates to disk brake devices known as floating-type disk brake devices. In particular, the present invention relates to floating-type disk brake devices in which a guide portion, disposed on at least one end of a disk pad in a rotational direction of a disk pad, is supported by a support portion provided on a mount such that the guide portion is movable in an axial direction of the disk but is prevented from being removed from the support portion along the radial direction of the disk pad.

2. Description of the Related Art

Floating-type disk brakes having various constructions are known. For example, Japanese Laid-Open Patent Publication No. 2000-27905 (U.S. Pat. No. 3,303,780) teaches a disk brake in which guide portions extending from both sides along the rotational direction of a disk pad are axially movably supported by support portions formed as recesses in a mount. Liners are disposed between the pad and the mount and have resiliently deformable arms that urge the pad to be tilted in the rotational direction of the disk (i.e., tilted counterclockwise around an axis parallel to the axis of rotation of the disk, as shown in FIG. 5). Thus, the resilient arms apply a torque to the pad, pressing the pad against the mount. The effect is that the pad is prevented from possible rattling movement relative to the mount. In addition, when the pad slidably contacts the disk, the pad receives more torque in the rotational direction of the brake disk, and this torque applies an additional moment force to the pad. In other words, the pad receives the moment produced by the disk and the moment produced by the resiliently deformable arms. As a result, the pad is strongly pressed against the mount by a force large enough to effectively prevent any rattling.

However, because the pad is tightly pressed against the mount by the biasing force of the resilient arms and by the moment produced by the brake disk, a very large friction force is generated between the pad and the mount when the pad is moved in the axial direction of the brake disk. In such a case, the pad cannot move smoothly in the axial direction.

SUMMARY OF THE INVENTION

It is accordingly an object of the present invention to teach improved floating-type disk brakes, in which a disk brake pad is facilitated to move along an axial direction of a brake disk.

According to one aspect of the present teachings, disk brake devices are taught that include a rotary brake disk, at least one pad, and a mount. The at least one pad has a guide portion disposed on at least one end of the pad in a rotational direction of the brake disk. The mount has a support portion that supports the guide portion, so that the pad can move in the axial direction of the brake disk while preventing the pad from being unintentionally removed from the mount. At least one of a radially outer pressure receiving surface and a radially inner pressure receiving surface are formed on the at least one end of the pad along the rotational direction of the brake disk. The at least one pressure receiving surface serves to receive a reaction force from the mount without applying a substantial moment to the pad. The pressure receiving surface functions to prevent the pad from moving in the rotational direction of the brake disk when the pad is forced to move in the axial direction of the brake disk. The radially outer pressure receiving surface and the radially inner pressure receiving surface are disposed, with respect to the brake disk, on a radially outer side and a radially inner side of the guide portion of the mount.

Because no substantial moment is applied to the pad in order to prevent the pad from moving in the rotational direction of the brake disk, the pressing force applied upon the mount by the pad can be reduced in comparison with a conventional brake device where a rotational torque is positively applied to the pad. Therefore, the friction force, that may be produced when the pad moves in the axial direction of the brake disk, can be reduced. As a result, the pad can smoothly move in an axial direction relative to the mount.

In another aspect of the present teachings, at least one of a radially outer support surface and a radially inner support surface is formed on the mount (the terms radially outer and radially inner are determined with respect to the brake disk). The radially outer support surface and the radially inner support surface are respectively disposed on the radially outer side and the radially inner side of the support portion. The at least one of the radially outer pressure receiving surface and the radially inner pressure receiving surface of a pad contacts with the corresponding at least one of the radially outer support surface and the radially inner support surface of the mount when the pad is pressed against the brake disk and is subsequently forced to move in the rotational direction of the brake disk.

Preferably, both of the radially outer pressure receiving surface and the radially inner pressure receiving surfaces are formed on the at least one end of the pad. Therefore, the pad may receive reaction forces from the mount at two locations on the same end. As a result, the movement of the pad in the rotational direction of the brake disk can be reliably counteracted and prevented.

The radially outer pressure receiving surface and the radially inner pressure receiving surface of the pad respectively contact with the radially outer support surface and the radially inner support surface when the pad is forced to move in the rotational direction of the brake disk, the pad is forced to move in the rotational direction of the brake disk when the pad is pressed against the surface of the brake disk.

Preferably, the radially outer pressure receiving surface and the radially inner pressure receiving surface extend within the same plane. Also preferably, the radially outer support surface and the radially inner support surface extend within the same plane. Therefore, the radially outer pressure receiving surface and the radially inner pressure receiving surface can respectively contact the radially outer support surface and the radially inner support surface in a surface-to-surface contact relationship.

In another aspect of the present teachings, the guide portion is positioned on a tangential line drawn through a point determined on the pad. The tangential line is drawn from a circle about the rotational axis of the brake disk and passes through the geometrical center of the pad. Consequently, the radially outer pressure receiving surface and the radially inner pressure receiving surface receive substantially the same reaction force from the mount.

Because the radially outer pressure receiving surface and the radially inner pressure receiving surface receive essentially the same magnitude of reaction force from the mount, the friction force produced at the radially outer pressure receiving surface is essentially equal to the friction force produced at the radially inner pressure receiving surface when the pad is moved in the axial direction. Therefore, the pad can move in an axial direction without being substantially forced to be inclined around an axis taken through the guide portions and extending across length of the pad. As a result, the pad can move more smoothly in the axial direction while the surface of the pad remains approximately parallel to the surface of the disk.

In another aspect of the present teachings, a biasing device is disposed between the guide portion and the support portion. The biasing device biases the guide portion in at least one of a radially inner direction and a radially outer direction. The guide portion may be reliably held so as to not directly contact the support portion. As a result, the guide portion can be reliably prevented from being inhibited or caught by the support portion. For example, the biasing device may include at least one resiliently deformable member.

Preferably, the biasing device biases the guide portion in both a radially inner and a radially outer direction. Therefore, even if a force is applied to tilt or rotate the pad around an axis parallel to the rotational axis of the disk (i.e., such as the friction force applied to the pad from the brake disk during braking), the guide portion (and the pad) may be reliably returned and maintained in a non-tilted position by the biasing forces applied from the radially outer side and radially inner side of the biasing device. This allows the guide portion to be held even more reliably so as to not contact the support portion. In addition, the guide portion can be further prevented from being inhibited or caught (e.g., due to fiction forces) by the support portion.

In another aspect of the present teachings, the biasing device also biases the guide portion in an axial direction (i.e., perpendicular to the surface of the brake disk) away from the brake disk. Therefore, the pad can be reliably held so as to not contact the surface of the disk when no braking operation is performed.

Preferably, the biasing device biases or urges the guide portion in an axial direction from both sides of the guide portion. Even more preferably, the biasing force applied to the guide portion from the radially outer side is larger than the biasing force applied to the guide portion from the radially inner side. Therefore, the radially outer side of the pad may be spaced farther away from the surface of the disk than the radially inner side.

For example, if a brake disk is mounted to a vehicle, such as an automobile, in a position inclined relative to the vehicle body, the brake disk may remain in contact with the radially outer side of the pad and cause a commonly known "dragging phenomenon". However, because the radially outer side of the pad is spaced a larger distance away from the disk than the radially inner side, according to the above arrangement, the dragging phenomenon may be prevented.

In another aspect of the present teachings, a support member is disposed between the guide portion and the support portion. Therefore, the guide portion and the support portion are prevented from directly contacting with each other. The support member subsequently aids in preventing wear through possible grinding contact between the guide portion and the support portion.

Preferably, the support member may be formed integrally with the biasing device. This would allow the number of parts of the disk brake device to be reduced. In addition, the biasing device can be attached to the mount or the pad at the same time that the support member is attached.

In another aspect of the present teachings, the support member includes at least one pressure receiving section and at least one insertion section that are joined to each other via a joint region. The at least one pressure receiving section is interposed between the at least one of the radially outer pressure receiving surface and the radially inner pressure receiving surface of the pad and the mount. The at least one pressure receiving section is clamped between the pad and the mount when the pad is forced to move in the rotational direction of the brake disk. The at least one insertion section is disposed between the guide portion and the support portion and extends from the at least one pressure receiving section in the rotational direction of the brake disk Therefore, the support member can be configured as an integral structure having the at least one pressure receiving section and at least one insertion section joined to each other via the joint region. As a result, the number of parts of the brake device can be reduced.

Preferably, the at least one pressure receiving section, the at least one insertion section, and the joint region, are all formed integrally with one another.

In another aspect of the present teachings, the at least one pressure receiving section and the at least one insertion section are resiliently pivotable relative to each other about the joint region.

Therefore, the pressure receiving section may pivot relative to the insertion section in response to the relative configuration of the pad (the radially outer pressure receiving surface or the radially inner pressure receiving surface) and the mount (the radially outer support surface or the radially inner support surface). The pressure receiving section closely contacts with the pad and the mount in a surface-to-surface contact relationship when the pad has moved in a rotational direction. This allows the inhibition or prevention of the generation of audible sounds of the pad against the mount.

Preferably, the joint region has a rigidness reduced portion in order to facilitate the pivoting movement. For example, the rigidness reduced portion has at least one slotted portion or at least one reduced thickness portion formed in the joint region. The rigidness reduced portion can be easily formed with this type of arrangement.

In another aspect of the present teachings, the rigidness reduced portion is a single slotted portion. The joint region further includes a pair of bridging portions connecting between the at least one pressure receiving section and the at least one insertion section. One of the bridging portions is disposed on one side of the slotted portion proximal to the brake disk. The other of the bridging portions is disposed on the other side of the slotted portion away from the brake disk.

The bridging portions may be positioned in alignment with each other in the axial direction of the brake disk (i.e., orthogonal to the surface of the brake disk). Therefore, the bridging portions may reliably prevent the pressure receiving section and the insertion section from being twisted relative to each other. As a result, the pressure receiving section can smoothly and uniformly pivot relative to the insertion section.

In another aspect of the present teachings, one of the guide portion and the support portion is configured as a projection. The other of the guide portion and the support portion is configured as a corresponding recess for receiving the projection. When the pad is tilted (i.e., rotated around an axis parallel to the rotational axis) with respect to the rotational direction of the brake disk, clearance between the projection and the recess prevents allows the at least one of the radially outer pressure receiving surface and the radially inner pressure receiving surface to contact with the mount prior to the locking of the projection and the recess (i.e., the projection applying a simultaneous force to the radially upper wall and the radially lower wall of the recess).

Therefore, the even if the pad has been tilted relative to the mount, the radially outer pressure receiving surface and/or the radially inner pressure receiving surface may contact with the mount (the radially outer support surface and/or the radially inner support surface) prior to the locking of the projection and the recess. Therefore, the pad can reliably receive a reaction force at the radially outer pressure receiving surface and/or the radially inner pressure receiving surface when the pad is forced to move in a rotational direction. Here the term "locking" is use to mean a condition where the projection and the recess can no further rotate relative to each other due to contact between the projection and the inner walls of the recess at two or more points.

DETAILED DESCRIPTION OF THE INVENTION

Each of the additional features and teachings disclosed above and below may be utilized separately or in conjunction with other features and teachings to provide improved disk brake devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

Figure 1:
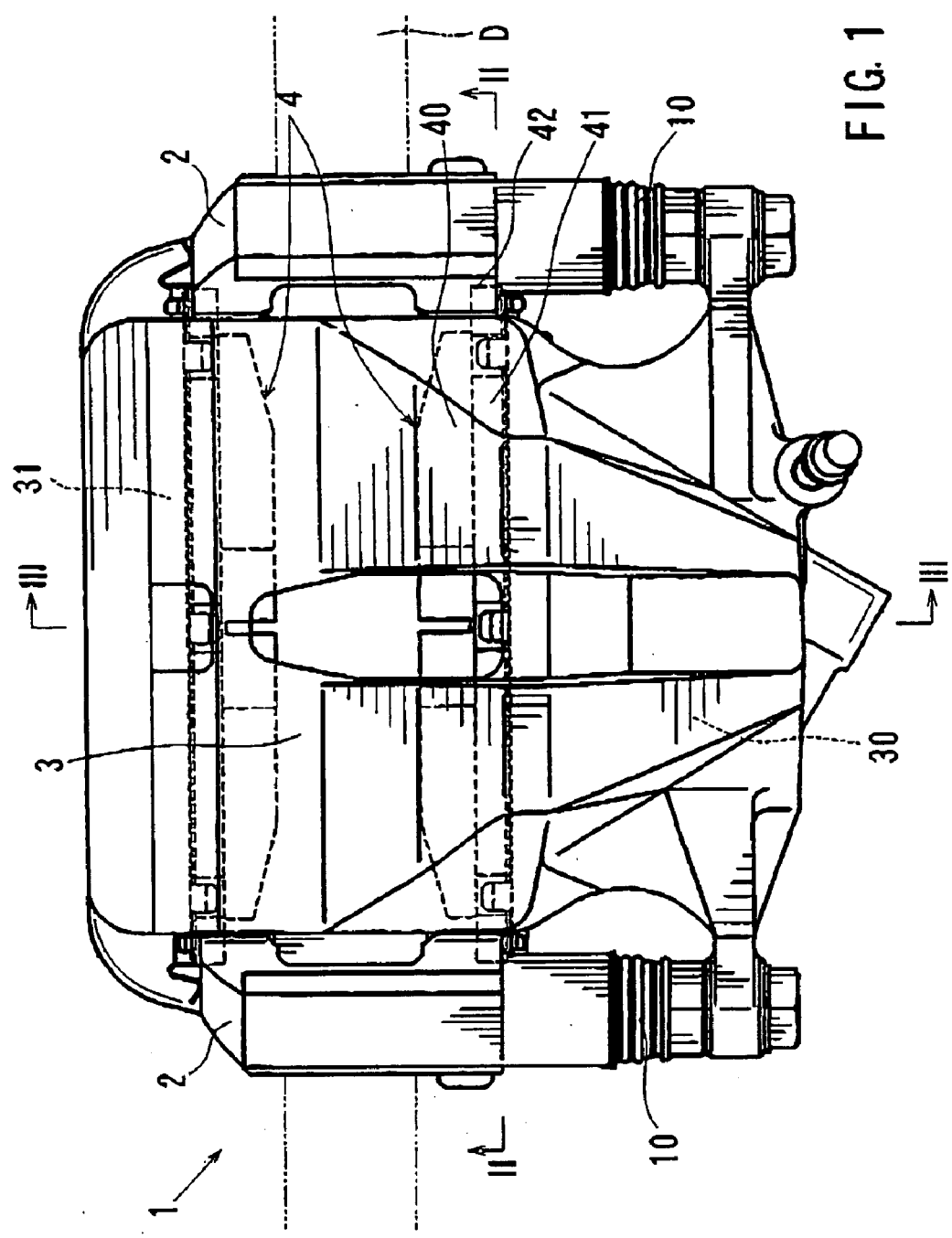
FIG. 1 is a plan view of a first representative disk brake device.

A first representative embodiment of the present invention will now be described with reference to FIGS. 1 to 3. As shown in FIG. 1, a brake device 1 according to the first representative embodiment generally includes a pair of pads 4, a mount 2, and a caliper 3. The mount 2 is adapted to be attached to a vehicle, such as an automobile (not shown). The pads 4 are supported on the mount 2 and positioned opposing an inner side surface and an outer side surface of the brake disk D (hereinafter simply called "inner side" and "outer side") The terms "inner side" and "outer side" are determined relative to the vehicle (i.e., the side nearest to the exterior of the vehicle is the "outer sided").

The caliper 3 is mounted on the mount 2 via slide pins 10 that are slidably movable relative to the mount 2. Consequently, the caliper 3 is movable relative to the mount 2 in an axial direction of the brake disk D via the slide pins 10. As a result, the brake disk D is typically centered between the two pads 4. As shown in FIG. 3, the caliper 3 has a piston 30 disposed on the inner side (lower side as viewed in FIG. 1) and a claw 31 respectively disposed on the outer side. The piston 30 serves to press a pad 4 (disposed on the inner side) against the inner surface of brake disk D. The caliper 3 then moves toward the inner side due to the reaction force of the pad 4 and piston 30 against the brake disk D. The movement of the caliper 3 moves the other pad 4 toward the inner side together with the claw 31. As a result, the claw 31 presses the other pad 4 (disposed on the outer side) against the outer surface of the brake disk D. The movement of the caliper 3 allows a substantially equal force to be applied to the inner surface and outer surface of the brake disk D.

Figure 2:
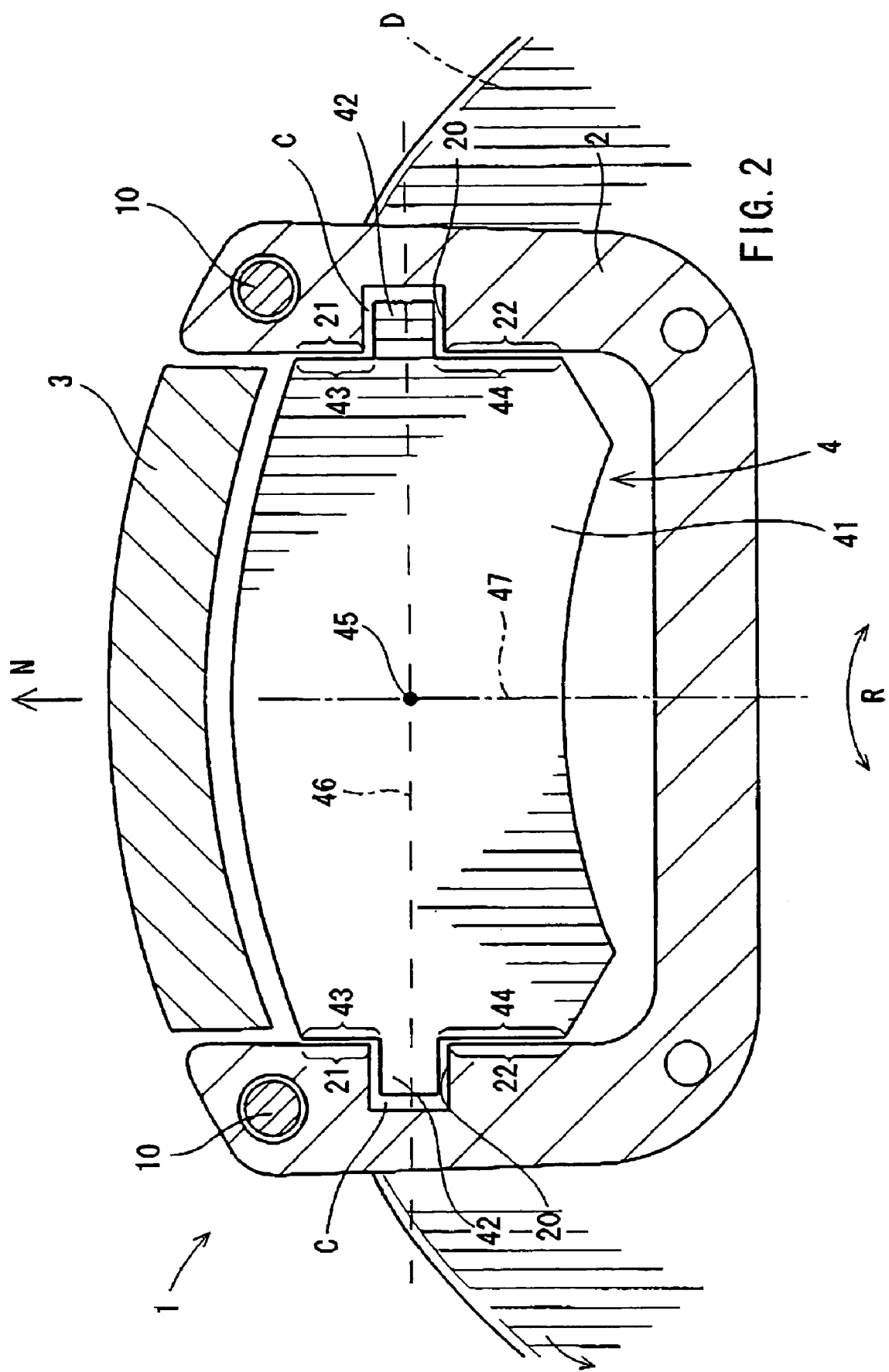
FIG. 2 is a cross sectional view taken along line II—II in FIG. 1.
Figure 3:
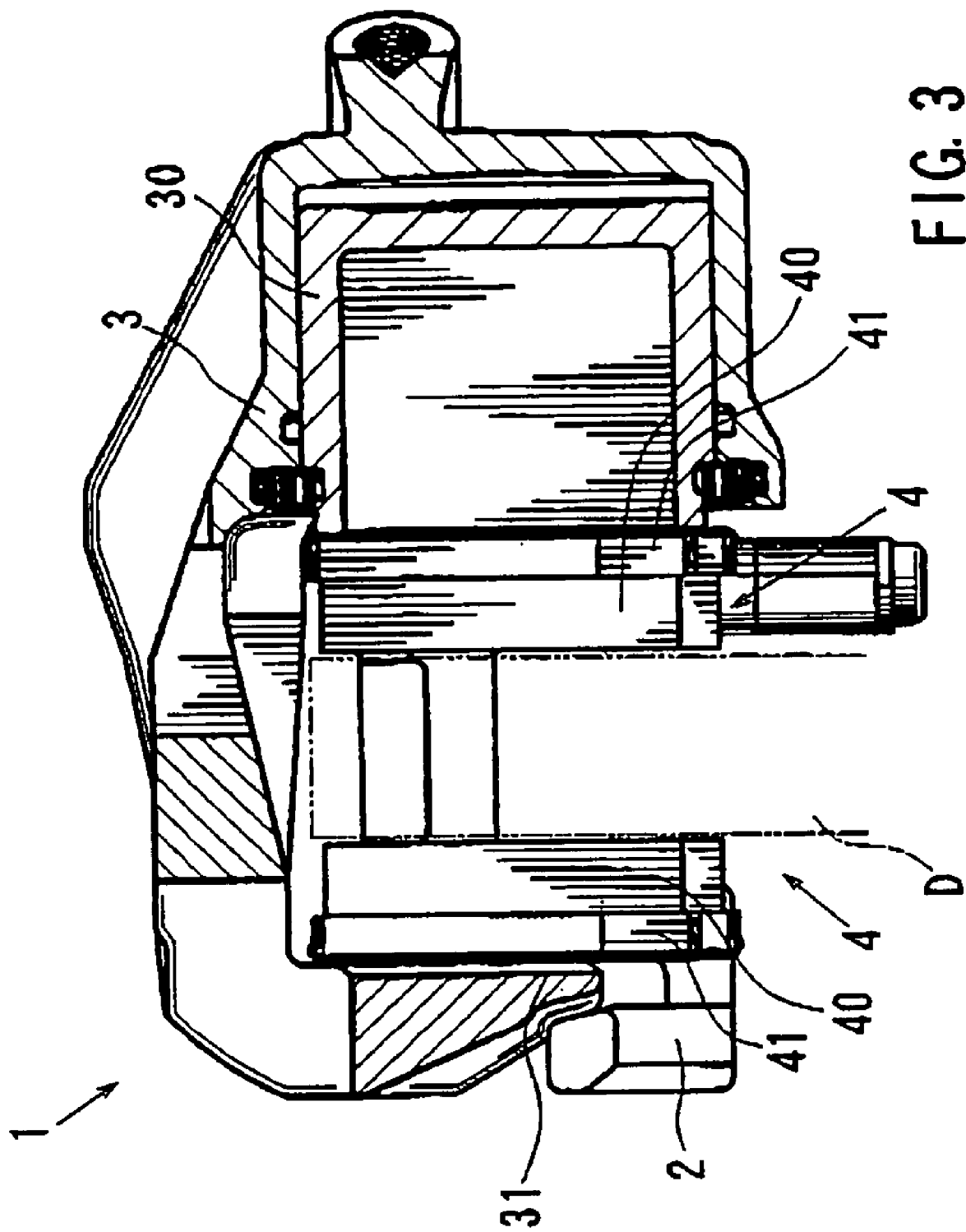
FIG. 3 is a cross sectional view taken along line III—III in FIG. 1.

As shown in FIG. 3, each pad 4 has a friction member 40 and a back plate 41. When each pad 4 is pressed against the brake disk D, the friction member 40 slidably contacts with surfaces of the disk D in order to apply a friction force restricting the rotation of brake disk D. The back plate 41 may be made of metal or resin and is attached to the rear surface of the friction member 40. A guide portion 42 (shown in FIG. 2) and a pair of pressure receiving portions, 43 and 44, are formed on the back plate 41 on each end of a pad 4 with respect to rotational directions R (i.e., a normal rotational direction of the brake disk D and a reverse direction opposite to the normal rotational direction). In this representative embodiment, the normal rotational direction (corresponding to the predominate direction of travel of the vehicle) is a left direction (counterclockwise direction) as viewed in FIG. 2. The reverse direction is a right direction (clockwise direction).

As shown in FIG. 2, each guide portion 42 projects outwardly in one of the rotational directions R of the brake disk D from the corresponding end of the back plate 41. In other words, each guide portion 42 is configured as a projection. Each guide portion 42 is inserted into one of the support portions 20 that are configured as corresponding recesses formed in the mount 2. Therefore, the guide portions 42 are prevented from being inadvertently removed from the corresponding support portions 20 in a radial direction N of the brake disk D. The support portions 20 extend in an axial direction (i.e., a direction of thickness or perpendicular to the plane of the drawing) of the brake disk D, so that the respective guide portions 42 are axially movably supported by the guide portions 20.

As shown in FIG. 2, each guide portion 42 is positioned on a line 46 passing through the geometrical center 45 of the corresponding pad 4. In addition, the line 46 is orthogonal to a central line connecting the geometrical center 45 of the corresponding pad 4 and the center of the rotation of the brake disk D. In other words, line 46 is a tangential line drawn to a circle formed about the rotational center axis of the brake disk and passing through the geometrical center 45.

The pads 4 are positioned such that the outer peripheral edges of the pads 4, with respect to the radial direction of the brake disk D, extend substantially along the outer peripheral edge of the brake disk D. Each guide portion 42 is positioned within the circumference of the brake disk D. Conversely, the slide pins 10 are positioned outside of the circumference of the brake disk D, at a radially outer distance relative to the outer peripheral edge of the brake disk D. Therefore, tie slide pins 10 do not directly interfere with the movement of the guide portions 42. The positions of the slide pins 10 may be chosen such that the slide pins 10 are spaced apart from each other by a relatively short distance.

As shown in FIG. 2, the pressure receiving portions 43 of each end of the back plate 41 are positioned on a radially outer side (above as viewed in FIG. 2) relative to the corresponding guide portions 42. Conversely, the pressure receiving portions 44 are positioned on a radially inner side relative to the corresponding guide portions 42. Thus, the pressure receiving portions 43 and 44 are positioned on either side of the corresponding guide portions 42. The pressure receiving portions 43 and 44 are also positioned adjacent to the corresponding guide portions 42. Further, the pressure receiving portions 43 and 44 are defined as substantially flat surfaces extending within the same plane. Preferably, the pressure receiving portions 43 and 44 extend within a plane that is parallel to a radial line 47 (established between the geometrical center 45 and the rotational center of the brake disk D) and is orthogonal to the surface the backing plate 41 of the corresponding pad 4 (i.e., orthogonal to the plane of the drawing in FIG. 2).

As shown in FIG. 2, the mount 2 has a pair of support portions 20 that oppose to each other in the rotational directions R of the brake disk D. The mount 2 also has two pairs of support surfaces 21 and 22. The support surfaces 21 and 22 in each pair are respectively positioned on the radially outer side and the radially inner side of each support portion 20.

The support surfaces 21 and 22 in each pair are positioned to directly oppose the corresponding pressure receiving portions 43 and 44 of the back plates 41 of the pads 4. Therefore the support surfaces 21 and 22 can engage in a surface-to-surface contact relationship with the corresponding pressure receiving portions 43 and 44. Thus, when the pads 4 are forced to move in one of the rotational directions R, e.g., in the normal direction (counterclockwise direction as viewed in FIG. 2), due to contact with the brake disk D, the pressure receiving portions 43 and 44, positioned on the end of the pad 4 in the rotational direction of the brake disk D (i e., on the left side of the pad 4 shown in FIG. 2 for a normal rotational direction), may contact with the corresponding support surfaces 21 and 22. The pressure receiving portions 43 and 44 may respectively receive reaction forces from the corresponding support surfaces 21 and 22. As a result, the pads 4 may be prevented from moving in the rotational direction.

The support surfaces 21 and 22 (in each pair) of the mount 2, positioned in the rotational directions R, extend within substantially the same or single plane. On the other hand, as noted previously the pressure receiving portions 43 and 44, positioned on each side in the rotational directions R, also extend within a single plane. Therefore, the pressure receiving portions 43 and 44 can still reliably contact the support surfaces 21 and 22 even if the pads 4 have been shifted in a radially outward direction, as indicated by the arrow N in FIG. 2. In addition, because the pressure receiving portions 43 and 44 contact with the corresponding support surfaces 21 and 22 in a surface-to-surface contact relationship, a large contact area can be established to further reliably prevent the movement of the pads 4 in the rotational direction.

Preferably, each support surface 21 and 22 of the mount 2 extends within a plane that is parallel to the radial line 47 indicated between the geometrical center 45 and the rotational center of the brake disk D and is orthogonal to the direction of thickness of the corresponding pad 4 (i.e., orthogonal to the plane of the drawing in FIG. 2). With this arrangement, the support surfaces 21 and 22 can reliably prevent the pads 4 from moving in a rotational direction. Thus, when the pads 4 contact with the rotating brake disk D, the pads 4 may be forced to move in a direction of the tangential line 46 extending from the geometrical center 45. Since the support surfaces 21 and 22 extend orthogonal to the moving direction of the pads 4, the movement of the pads 4 can be prevented by the support surfaces 21 and 22 from the side directly confronting the moving direction. In addition, since the forces on the support surfaces 21 and 22 may be relatively equal to one another, no substantial moment (torque) may be applied to the pads 4 when the movement of the pads 4 has been prevented.

As shown in FIG. 2, a clearance C is formed between each support portion 20 of the mount 2 and the corresponding guide portions 42 of the pads 4. The clearance C is determined to be large enough so as to permit the corresponding radially outward and inward pressure receiving portions 43 and 44 of each pad 4 to contact the support surfaces 21 and 22 of the mount 2 prior to the guide portion 42 contacting the radially upper and radially lower walls of the support portion 20 as a result of tilting movement (i.e., the pad 4 rotating around an axis parallel to the rotational axis of the brake disk D) of the pads 4 in the rotational direction of the brake disk D.

In this way, the radially outward and radially inward pressure receiving portions 43 and 44 of each pad 4 can reliably contact the corresponding support surfaces 21 and 22 of the mount 2 without causing the locking together of the guide portion 42 and the support portion 20, even if the pads 4 have been tilted in the rotational direction. Here, the term "lock" is used to represent the condition where the guide portion 42 and the support portion 20 contact one another at two or more points and are unable to further rotate relative to each other.

As described above, according to the brake device 1 of the first representative embodiment, the guide portion 42 and the pressure receiving portions 43 and 44 are formed on each of the ends of each pad 4 along a rotational direction. When the pads 4 move in a rotational direction, the pressure receiving portions 43 and 44 contact the mount 2. The pressure receiving portions 43 and 44 then experience reaction forces from the mount 2. In other words, each pad 4 receives reaction forces from the mount 2 at two different locations on a single end of each pad 4 in the rotational direction. Since the two different locations are radially outward and radially inward of the geometric center of a pad 4, no substantial moment is produced so as to apply a rotational torque to the pad 4. As a result, the total force pressing the pads 4 against the mount 2 may be reduced in comparison with a conventional brake device. In a conventional brake device a rotational torque is positively applied to the pads 4 and causes an increase in the total force pressing the pads 4 against the mount 2, and a corresponding increase in the frictional force acting upon the pads 4.

When the pads 4 move relative to the mount 2 in the axial direction of the brake disk D, friction forces may be generated between the pads 4 and the mount 2. However, such frictional forces may be small in comparison with a conventional brake device for the reason described above. Consequently, the pads 4 can smoothly move in an axial direction relative to the mount 2. This means that the pads 4 can smoothly move in the direction of thickness of the pads 4 (i.e., essentially perpendicular to the surface of the brake disk D). The energy required for pressing the pads 4 against the brake disk D can be reduced. In addition, the pads 4 can smoothly move away from the brake disk D when no braking force is applied. Therefore, even if the brake disk D has intermittent contact with the pads 4 due to possible warping or shaking of the brake disk D, the pads 4 can be forced to smoothly move away from the brake disk D due to the contact. For this reason, dragging forces applied to the pads 4 can be reduced and the generation of audible squealing sounds can be reduced. Furthermore, the movement of the pads 4 in the rotational direction can be reliably and stably prevented through the contact of the two pressure receiving portions 43 and 44.

As shown in FIG. 2, the guide portions 42 are positioned on the tangential line 46 that passes through the geometrical center of each pad 4. Therefore, the pressure applied to the radially outer pressure receiving portion 43 may be substantially equal to the pressure applied to the radially inner pressure receiving portion 44. Thus, when the pads 4 move in the rotational direction, the mount 2 applies the same level of pressure (reactive force) against each of the pressure receiving portions 43 and 44 that are positioned on one side in the rotational direction of each pad 4.

Therefore, when the pads 4 move in the axial direction of the brake disk D while the pressure receiving portions 43 and 44 are contacting the mount 2, the same friction force is applied to the radially outward pressure receiving portion 43 and to the radially inward pressure receiving portion 44. For this reason, the pads 4 can stably move in the axial direction without being greatly forced to tilt relative to the axial direction of the brake disk D (i.e., such as rotating about an axis passing through the length of the pad 4 and each of the guide portions 42). As a result, the pads 4 can move in the axial direction while stably maintaining an orientation approximately parallel to the surface of the brake disk D.

Second Representative Embodiment

A second representative embodiment will now be described with reference to FIGS. 4 through 8. The second representative embodiment is a modification of the first representative embodiment. Therefore, in FIGS. 4 to 8, like members are given the same reference numerals as FIGS. 1 to 3. The description of these members will not be repeated.

Figure 4:
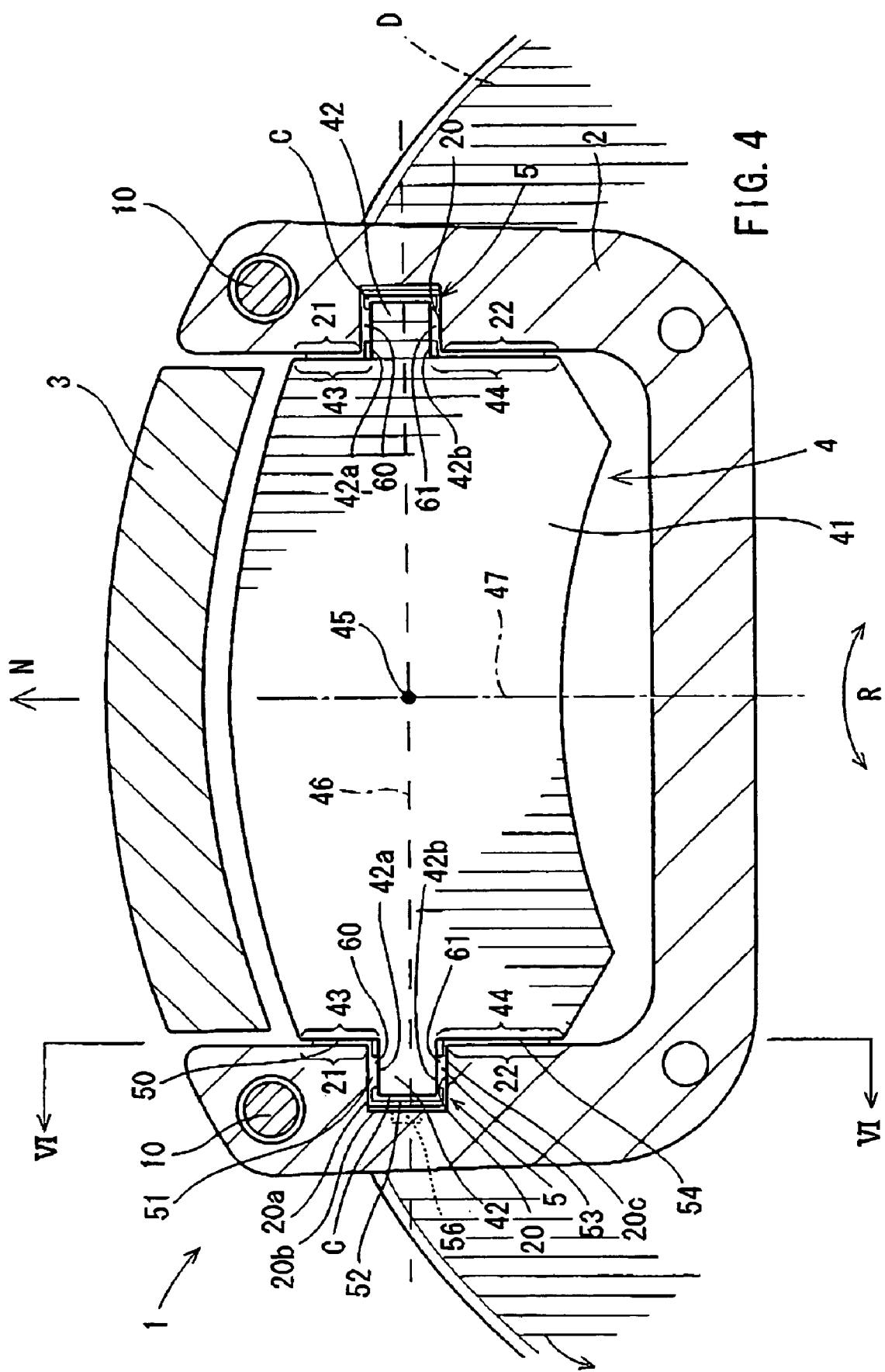
FIG. 4 is a cross sectional view similar to FIG. 2 but showing a second representative disk brake device.

In this second representative embodiment, as shown in FIG. 4, support members 5 are fitted into the clearances C that are formed between the guide portions 42 of the pads 4 and the support portions 20 of the mount 2. The support member 5 serves to prevent the guide portions 42 and the support portions 20 from directly contacting one another. In addition, the support member 5 aids in preventing the wear and grinding together of the guide portions 42 and the support portions 20.

Figure 5:
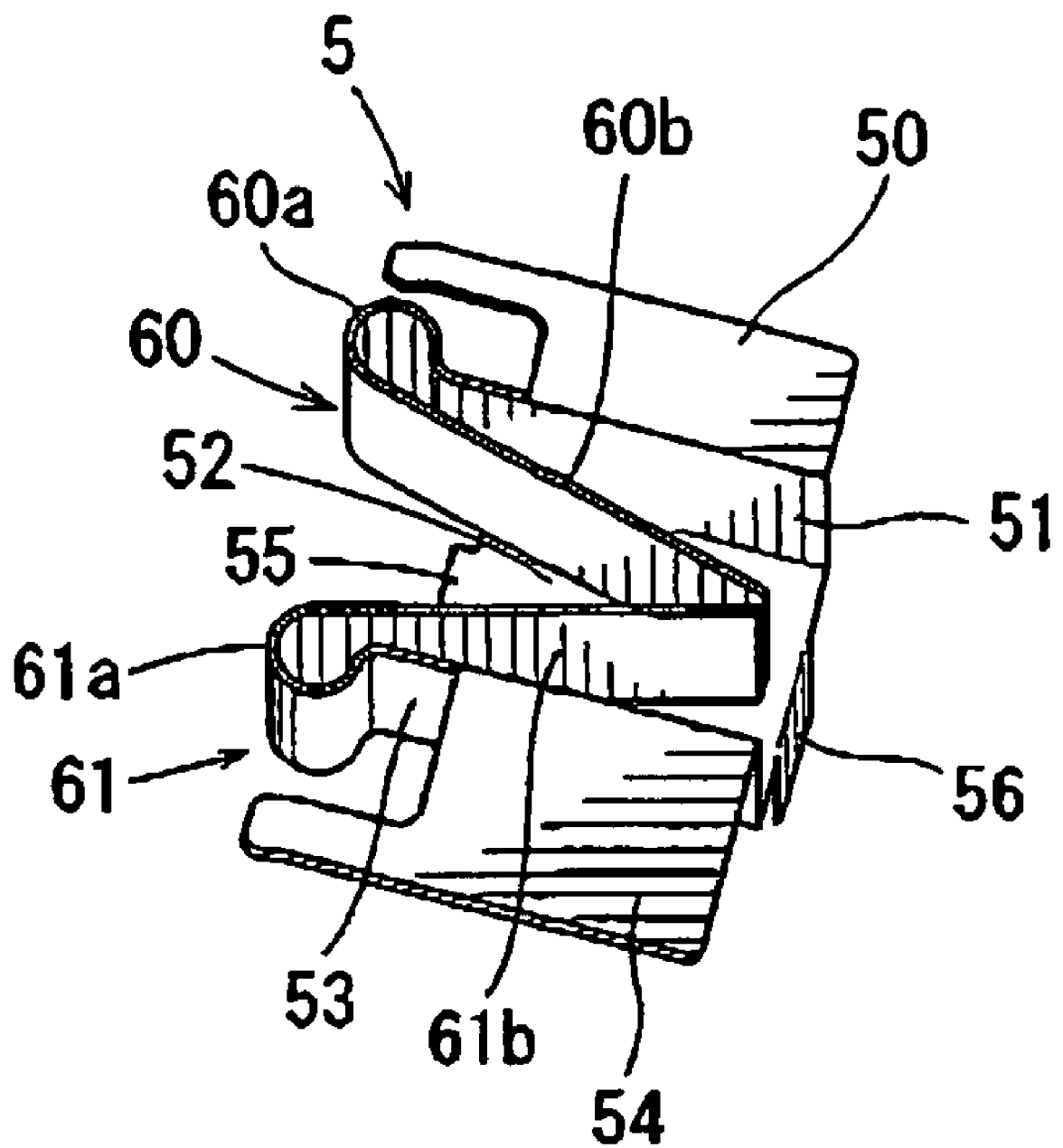
FIG. 5 is a perspective view of a support member of the second representative disk brake device.

Referring to FIG. 5, each of the support members 5 is made of a spring plate. The support members 5 have an integral structure with a pair of pressure receiving sections, 50 and 54, a pair of insertion sections, 51 and 53, a joint section 52, and a pair of resiliently deformable sections, 60 and 61.

As shown in FIG. 4, the pressure receiving section 50 is adapted to be positioned between the radially outward pressure receiving portion 43 of each pad 4 and the support surface 21 of the mount 2. The pressure receiving section 54 is adapted to be positioned between the radially inward pressure receiving portion 44 and the support surface 22. When the pads 4 have been moved in the rotational direction of the brake disk D, the pressure receiving sections 50 and 54, positioned on the side of each support member 5 in the rotational direction, are respectively clamped between the pressure receiving portion 43 and the supporting surface 21 and between the pressure receiving portion 44 and the support surface 22. As a result, the pressure receiving section 50 may contact with the pressure receiving portion 43 and the support surface 21 in surface-to-surface contact relationship. Similarly, the pressure receiving section 54 may also contact with the pressure receiving portion 44 and the support surface 22 in surface-to-surface contact relationship.

As shown in FIG. 5, the insertion sections 51 is joined to one side (the lower side as viewed in FIGS. 4 and 5) of the pressure receiving section 50 and extends substantially orthogonal to the pressure receiving section 50. The insertion section 53 is joined to one side (the upper side as viewed in FIGS. 4 and 5) of the pressure receiving section 54 and also extends substantially orthogonal to the pressure receiving section 54.

As shown in FIG. 4, in the fitted state of the support member 5, the insertion sections 51 and 53 extend from their respective pressure receiving sections 50 and 54 toward the bottom 20*b* of the support portion 20. Thus, the insertion section 51 extends substantially parallel to a radially outward side surface 20*a* of the support portion 20. The resiliently deformable section 60 is joined to the insertion section 51. In the fitted state, the resiliently deformable section 60 is resiliently deformed so as to be positioned between the insertion section 51 and a radially outward guide surface 42*a* of the guide portion 42. As a result of the resiliently deformable section 60, the guide surface 42*a* is biased in a radially inward direction of the brake disk D. Similarly, the insertion section 53 extends substantially parallel to a radially inward side surface 20*c* of the support portion 20. The resiliently deformable section 61 is joined to the insertion section 53. In the fitted state, the resiliently deformable section 61 is resiliently deformed so as to be positioned between the insertion section 53 and a radially inward guide surface 42*b* of the guide portion 42. As a result of the resiliently deformable section 61, the guide surface 42*b* is biased in a radially outward direction of the brake disk D.

Referring again to FIG. 5, the resiliently deformable section 60 has a curved part 60*a* and a linear part 60*b*. The resiliently deformable section 61 also has a curved part 61*a* and a linear part 61*b*. The curved part 60*a* extends from one end (left end as viewed in FIG. 5) of the insertion section 51 in such a manner that the curved part 60*a* turns back toward the insertion section 51. The linear part 60*b* extends from the curved part 60*a* toward and along the insertion section 51 and is inclined relative to the insertion section by an angle 60*c* in an unloaded condition. Similarly, the curved part 61*a* extends from one end (left end as viewed in FIG. 5) of the insertion section 53 in such a manner that the curved part 61*a* turns back toward the insertion section 53. The linear part 61*b* extends from the curved part 61*a* towards and along the insertion section 53 and is inclined relative to the insertion section 53 by an angle 61*c* in an unloaded condition.

Figure 6:
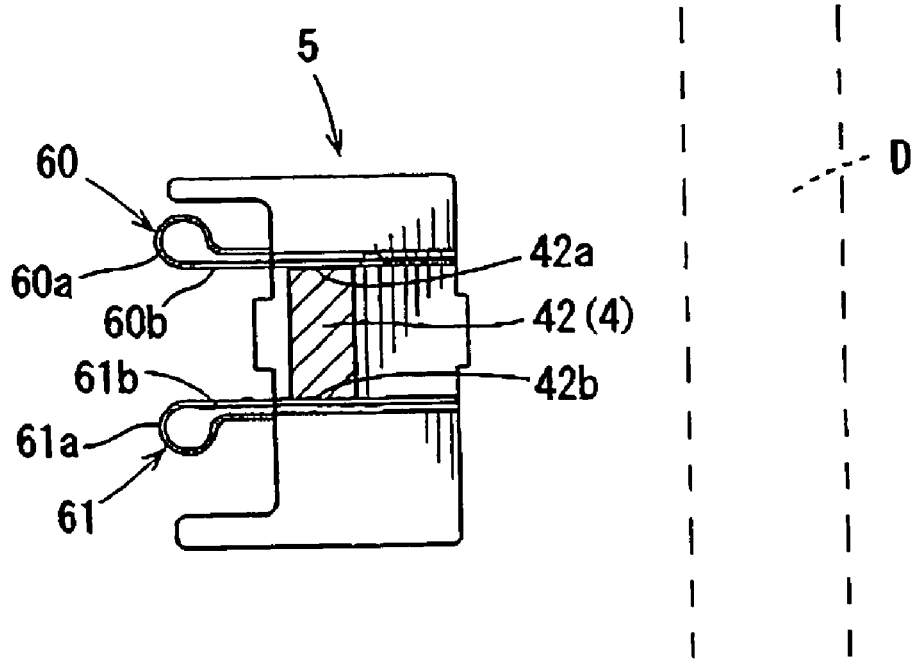
FIG. 6 is a cross sectional view taken along line VI—VI in FIG. 4.
Figure 7:
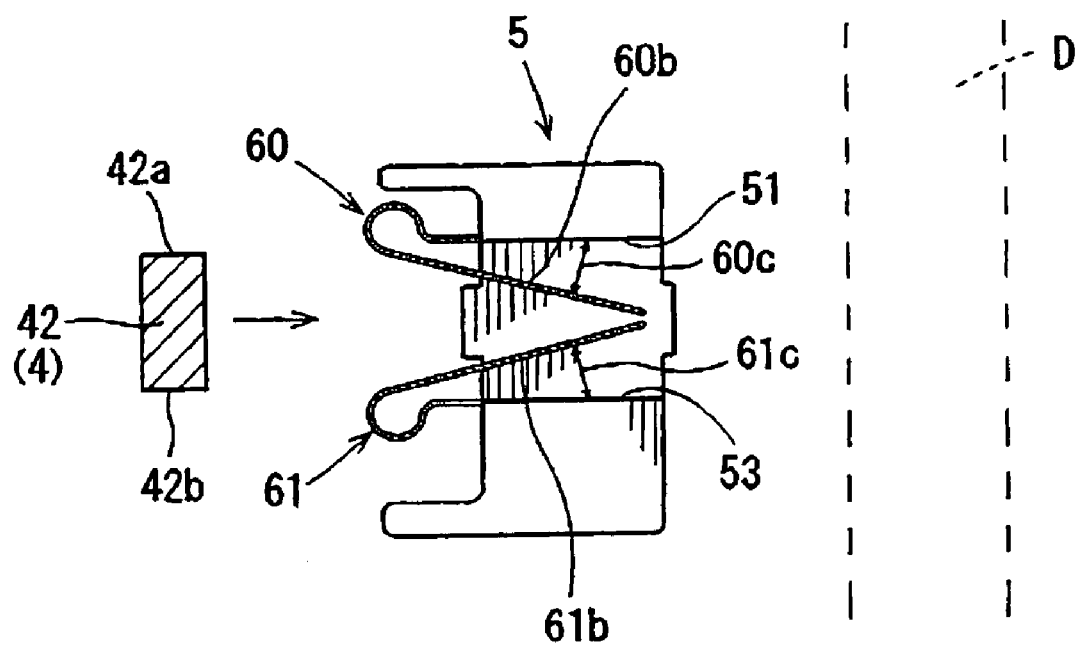
FIG. 7 is a cross sectional view similar to FIG. 6 but showing the operation for inserting a guide portion into a support member.

As shown in FIGS. 6 and 7, during the fitting operation of the support member 5, the corresponding guide portion 42 of the pad 4 is forcibly inserted between the resiliently deformable sections 60 and 61. The pad 4 is moved in a direction toward the brake disk D, causing that the resiliently deformable sections 60 and 61 to be respectively deformed at the curved parts 60*a* and 61*a*. Thus, the radius of curvature of the curved parts 60*a* and 61*a* decreases in response to the increasing amount of insertion of the guide portion 42 between the resiliently deformable sections 60 and 61. At the same time, the linear sections 60*b* and 61*b* are forced to gradually increase the distance therebetween (i.e., they spread apart towards insertion sections 50 and 53).

In this way, the amount of deformation of the resiliently deformable sections 60 and 61 increases due to the increasing amount of insertion of the guide portion 42 in a direction towards the brake disk (i.e., to the right as seen in FIG. 6). Therefore, the resiliently deformable sections 60 and 61 may produce resilient biasing forces to bias the guide portion 42 in a direction away from the brake disk D.

Figure 8:
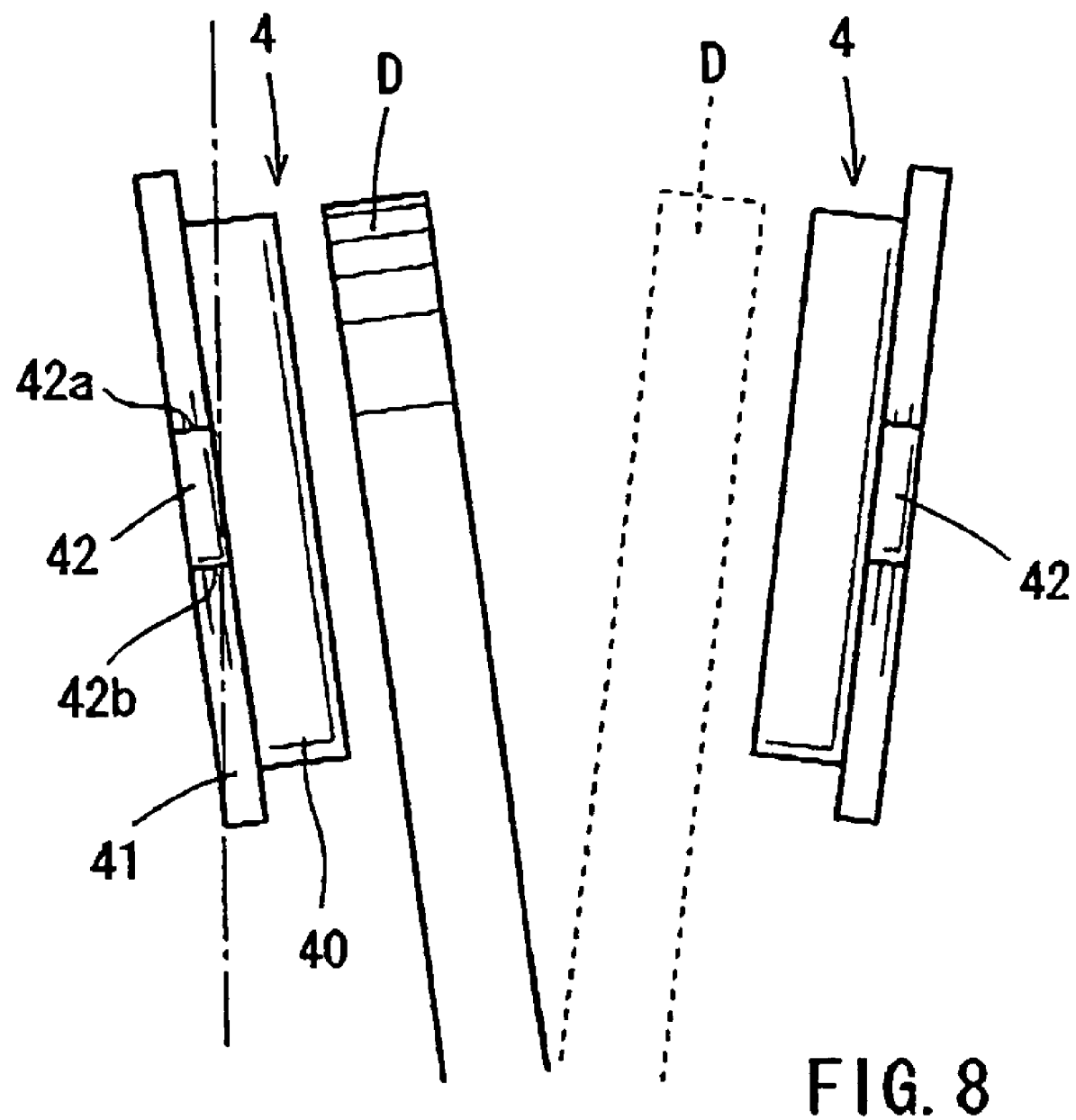
FIG. 8 is an explanatory side view showing the relationship between a brake disk and pads of the second representative disk brake device when the brake disk is inclined relative to the vehicle.

Preferably, the inclination angle 60*c* of the linear section 60*b* is greater than the inclination angle 61*c* of the linear section 61*b* (see FIG. 7). Therefore, the linear section 60*b* biases the guide portion 42 in the direction away from the brake disk D by a larger force than the linear section 61*b*. In other words, the radically outer guide surface 42*a* of the guide portion 42 receives a larger force than the radially inner guide surface 42*b*. Each pad 4 may be slightly inclined relative to the brake disk D in the direction of the thickness of the pad 4 with the radially outer side of the pad 4 being spaced away from the brake disk D by a larger distance than the radially inner side of the pad 4, as shown in FIG. 8.

Referring to FIGS. 4 and 5, the joint section 52 connects the insertion sections 51 and 53 on the side opposite to the pressure receiving sections 50 and 54. In the fitted state of the support member 5, the joint section 52 is positioned within the support portion 20 so as to extend substantially parallel to the bottom surface 20*b* of the support portion 20. As shown in FIG. 5, a pair of attaching portions 55 and 56 is formed on the joint section 52 and extends toward the bottom surface 20*b* of the support portion 20 in the fitted state (see FIG. 4). Thus, the attaching portions 55 and 56 are attached to the mount 2 at the bottom surface 20*b* of the support portion 20 in order to fixedly secure the support member 5 to the mount 2.

According to the second representative embodiment, each guide portion 42 of each pad 4 is biased in both the radially inward direction and the radially outward direction by the resiliently deformable sections 60 and 61 of the support member 5. The resiliently deformable sections 60 and 61 are disposed between the guide portion 42 and the support portion 20 as shown in FIG. 4.

Therefore, when the pad 4 is forced to move in the rotational direction, tending to cause the tilting of the guide portion 42 relative to the corresponding guide portion 20 during the braking operation by the pad 4, the resiliently deformable sections 60 and 61 cooperate with each other to return the guide portion 42 to an original non-tilted position. In addition, because the resiliently deformable sections 60 and 61 are interposed between the guide portion 42 and the support portion 20, the guide portion 42 can be reliably and forcibly spaced apart from the support portion 20. As a result, the guide portion 42 and the support portion 20 can be reliably prevented from being locked together by the resiliently deformable sections 60 and 61.

Further, the resiliently deformable sections 60 and 61 bias the guide portion 42 in a direction away from the brake disk D (i.e., to the left as seen in FIG. 6). Consequently, the pad 4 is biased in a direction away from the brake disk D. As a result, when a braking operation is not being performed, the pad 4 is reliably held in a position away from the brake disk D.

Furthermore, as described in connection with FIGS. 6 and 7, the guide portion 42 is biased such that the biasing force applied to the radially outer side of the pad 4 is greater than the biasing force applied to the radially inner side of the pad 4. Therefore, each pad 4 may be inclined relative to the brake disk D in the direction of the thickness of the pad 4. The radially outer side of the pad 4 being spaced apart from the brake disk D by a larger distance than the radially inner side of the pad 4 (i.e., a counterclockwise inclination as seen in FIG. 6).

The phenomenon known as "a dragging phenomenon" may occur where the brake disk D is mounted in a position inclined relative to a vehicle body (see FIG. 8). Thus, this phenomenon is caused when the brake disk D accidentally contacts the radially outer side of the pads 4. However, according to the second representative embodiment, the radially outer sides of the pads 4 are held apart from the brake disk D by a larger distance than the radially inner sides. Thus, the pads 4 can be suitably spaced from the brake disk D so as to not cause the dragging phenomenon.

Further, as shown in FIG. 4, the support member 5 is disposed between the guide portion 42 and the corresponding support portion 20. The guide portion 42 and the corresponding support portion 20 are prevented from directly contacting with each other and causing wearing or grinding together. In addition, the resiliently deformable sections 60 and 61 are formed integrally with the support member 5 (see FIG. 5). Therefore, the incorporation of the resiliently deformable sections 60 and 61 does not result in an increase in the number of elements of the brake device. The resiliently deformable sections 60 and 61 can be attached to the mount 2 at the same time that the support member 5 is attached.

When a force is applied to the guide portion 42 to tilt the guide portion 42 relative to the support portion 20 (i.e., in a direction around an axis parallel to the rotational axis), the resiliently deformable sections 60 and 61 cooperate so as to bias the guide portion 42 to return to the original non-tilted position. In other words, the resiliently deformable sections 60 and 61 prevent the pad 4 from remaining Tilted out of the original position of pad 4. Therefore, the pads 4 can reliably receive the reaction forces from the pressure receiving portions 43 and 44 that are positioned on a side in the rotational direction.

Third Representative Embodiment

Figure 9:
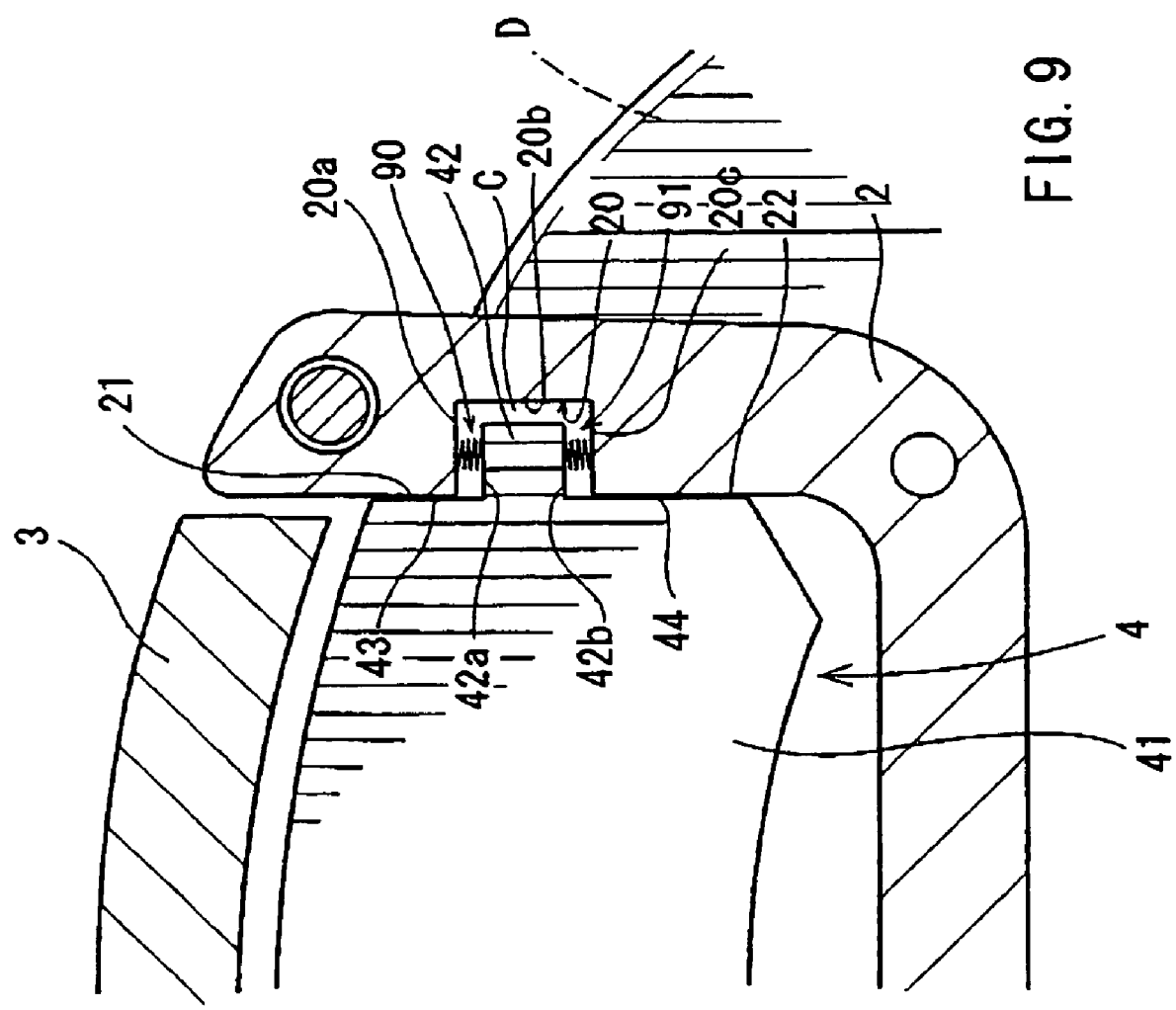
FIG. 9 is a cross sectional view similar to a part of FIG. 4 but showing a portion of a third representative disk brake device.
Figure 10:
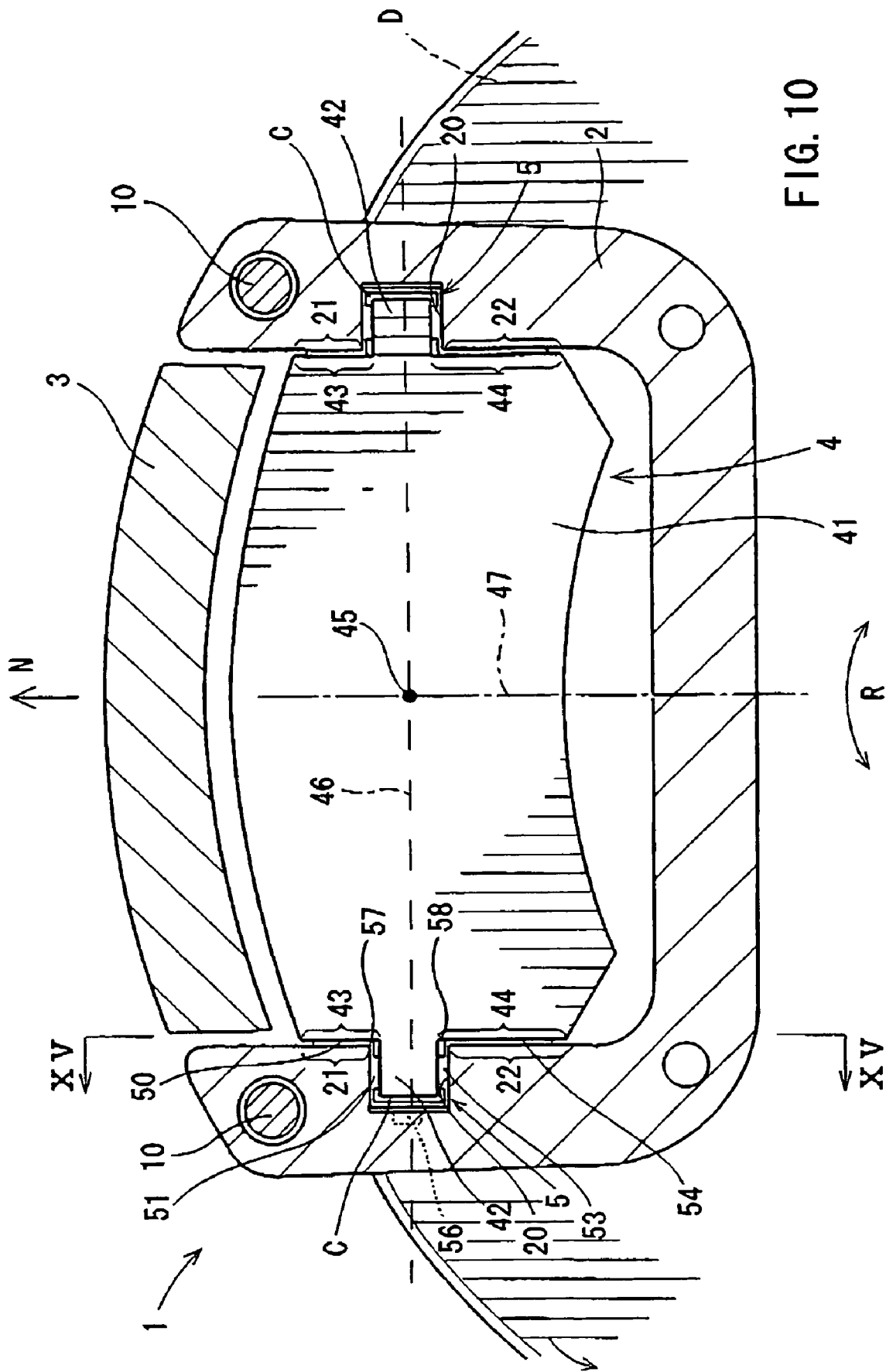
FIG. 10 is a cross sectional similar to FIG. 2 but showing a fourth representative disk brake device.

A third representative embodiment will now be described with reference to FIG. 9. The third representative embodiment is a modification of the second representative embodiment. Therefore, in FIG. 9, like members are given the same reference numerals as in FIGS. 4 to 8. The description of these members will not be repeated.

The third representative embodiment is different from the second representative embodiment mainly in the use of separate resilient members 90 and 91, configured for example as coil springs, in place of support member 5. The resilient members 90 and 91 are disposed within the clearance C formed between the guide portion 42 and the corresponding support portion 20.

The resilient member 90 is interposed between the radially outward side surface 20a of the support portion 20 and the radially outward guide surface 42a of the guide portion 42. The resilient member 90 is deformed or compressed in order to fit within the clearance C. Therefore, the resilient member 90 biases the radially outward guide surface 42a toward the radially inner side of support portion 20. Conversely, the resilient member 91 is interposed between the radially inner side surface 20c and the radially inner guide surface 42b. The resilient member 91 is also deformed or compressed in order to fit within the clearance C. Therefore, the resilient member 91 biases the radially inner guide surface 42b toward the radially outer side of support portion 20.

The resilient members 90 and 91 may bias the guide portion 42 in the same manner as the resiliently deformable sections 60 and 61 of the support member 5 of the second representative embodiment Therefore, the resilient members 90 and 91 may also bias the guide portion 42 in a direction away from the brake disk D. For example, each of the resilient members 90 and 91 may apply a biasing force obliquely to the guide portion 42. The guide portion 42 is then biased in both a radial direction and an axial direction (the axial direction is away from the brake disk D). In addition, due to the biasing forces of the resilient members 90 and 91, each pad 4 may be inclined relative to the brake disk D in the direction of the thickness of the pad 4. The radially outer side of the pad 4 may be spaced apart from the brake disk D by a larger distance than the radially inner side of the pad 4 (see FIG. 8). This result may be attained by specifying the modulus of elasticity of the resilient member 90 to be greater than the modulus of elasticity of the resilient member 91. Otherwise, the biasing direction of the resilient member 90 may be less in the axial direction away from the brake disk D relative to the biasing direction of the resilient member 91.

The resilient members 90 and 91 may be formed separately from the pad 4 and the mount 2. Otherwise, the resilient members 90 and 91 may be formed integrally with or joined to each pad 4 or the mount 2. In addition, in place of coil springs, the resilient members 90 and 91 may be leaf springs, or elastic materials such as rubber and plastics having elasticity.

Fourth Representative Embodiment

A fourth representative embodiment will now be described with reference to FIGS. 10 to 16. The third representative embodiment is another modification of the second representative embodiment. Therefore, in FIGS. 10 to 16, like members are given the same reference numerals as in FIGS. 4 to 8, and the description of these members will not be repeated.

Figure 11:
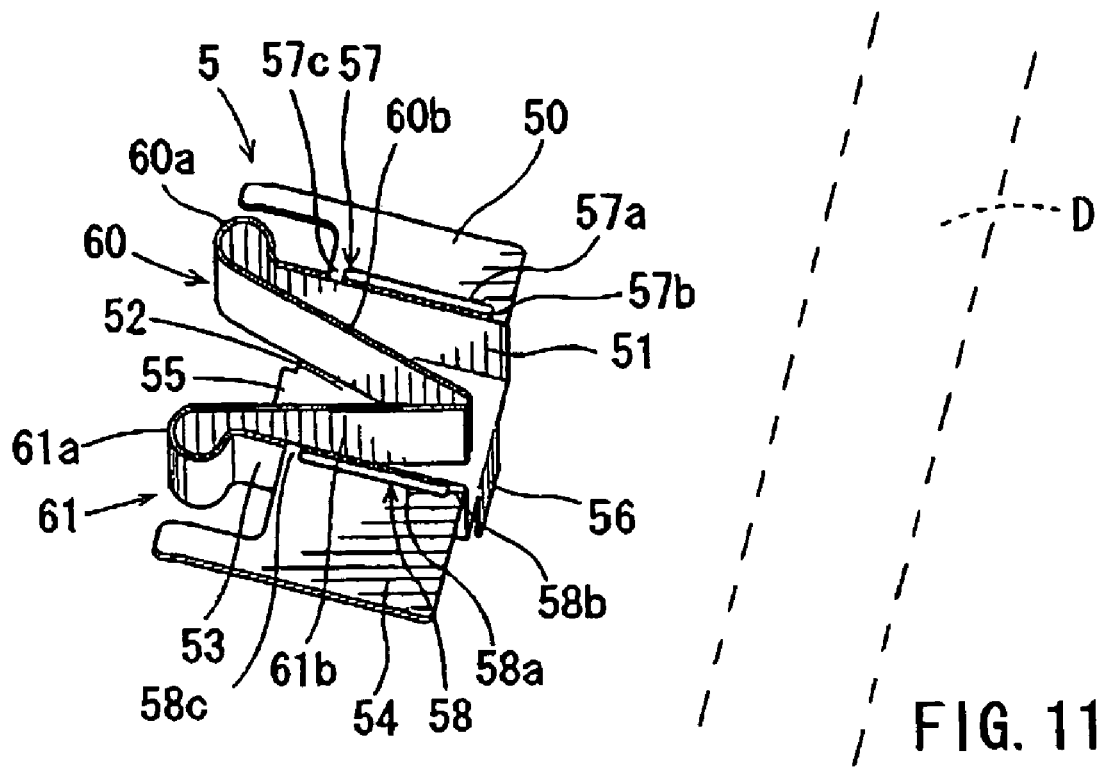
FIG. 11 is a perspective view of a support member of the fourth representative disk brake device.

As shown in FIG. 11, similar to the support members 5 of the second representative embodiment, each of the support members 5 of the fourth representative embodiment is made of a spring plate. The support members 5 also have an integral structure with a pair of the pressure receiving sections, 50 and 54, a pair of the insertion sections, 51 and 53, the joint section 52, and a pair of the resiliently deformable sections 60 and 61. In the fitted state of the support member 5, the radially outer pressure receiving section 50 is positioned between the pressure receiving portion 43 and the support surface 21. The radially inner pressure receiving section 54 is positioned between the pressure receiving portion 44 and the support surface 22. In addition, the insertion sections 51 and 53 are joined to and extend from their respective pressure receiving sections 50 and 54 toward the bottom 20b of the support portion 20. In other words, the insertion sections 51 and 53 extend from their respective pressure receiving sections 50 and 54 in the rotational direction R of the disk brake (more specifically, parallel to the tangential line 46).

The support member 5 of the fourth representative embodiment is different than the support member 5 of the second representative embodiment in the configurations of the joint regions 57 and 58 that respectively connect the pressure receiving sections 50 and 54 to the insertion sections 51 and 53.

Figure 12:
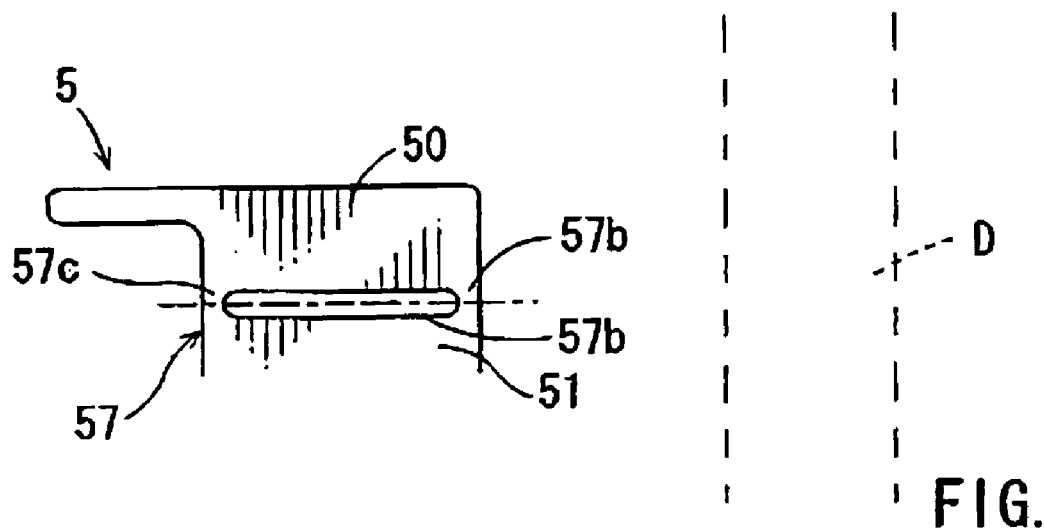
FIG. 12 is a view in developed form of a part around a joint region of the support member of the fourth representative disk brake device.

As shown in FIG. 12, the joint region 57 has a slotted portion 57a and a pair of bridging portions 57b and 57c. The slotted portion 57a serves as a portion for facilitating the pivoting movement at the joint region 57. The slotted portion 57a is positioned centrally in the joint region 57 and is preferably configured as an elongated slot. The bridging portion 57b is disposed at one end of the slotted portion 57a on the side proximal to the brake disk D and connects the pressure receiving section 50 and the insertion section 51. The bridging portion 57c is disposed at the other end of the slotted portion 57a on the side away from the brake disk D and also connects the pressure receiving section 50 and the insertion section 51. In the fitted state of the support member 5, the bridging portions 57b and 57c are aligned with each other in the axial direction of the brake disk D.

Figure 13:
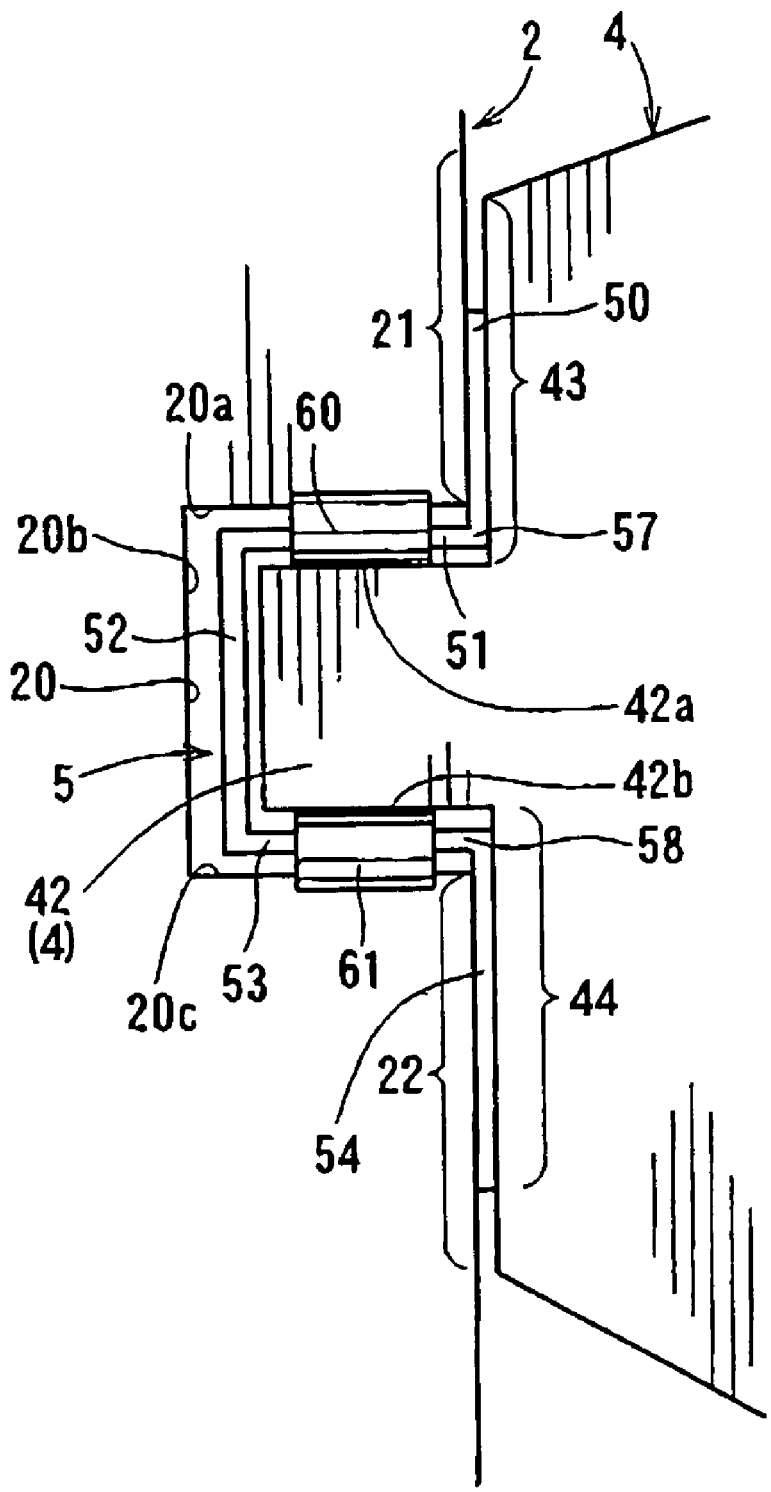
FIG. 13 is a cross sectional view of the fourth representative disk brake device around the support member.

The joint region 58 is similar to the joint region 57. Joint region 58 has a slotted portion 58a and a pair of bridging portions 58b and 58c that are respectively configured similarly to the slotted portion 57a and the pair of the bridging portions 57b and 57c, as shown in FIG. 13.

With the incorporation of the joint regions 57 and 58 respectively having the slotted portions 57a and 58a as described above, the joint regions 57 and 58 have reduced rigidness as compared with the remainder of the support member 5. Therefore, when a force is applied to bend the pressure receiving region 50(54) and the insertion region 51(53) relative to each other, the bending force may be concentrated in the bridging portions 57b and 57c (58b and 58c). This causes the stresses applied to the bridging portions 57b and 57c (58b and 58c) to increase.

As a result, the bending force can easily resiliently deform the bridging portions 57b and 57c (58b and 58c). In other words, the presence of the slotted portion 57a (58a) facilitates the easy deformation of the bridging portions 57b and 57c (58b and 58c). The pressure receiving section 50 (54) can therefore be easily pivoted relative to the insertion section 51 (53) due to the presence of the slotted portion 57a (58a).

Figure 14:
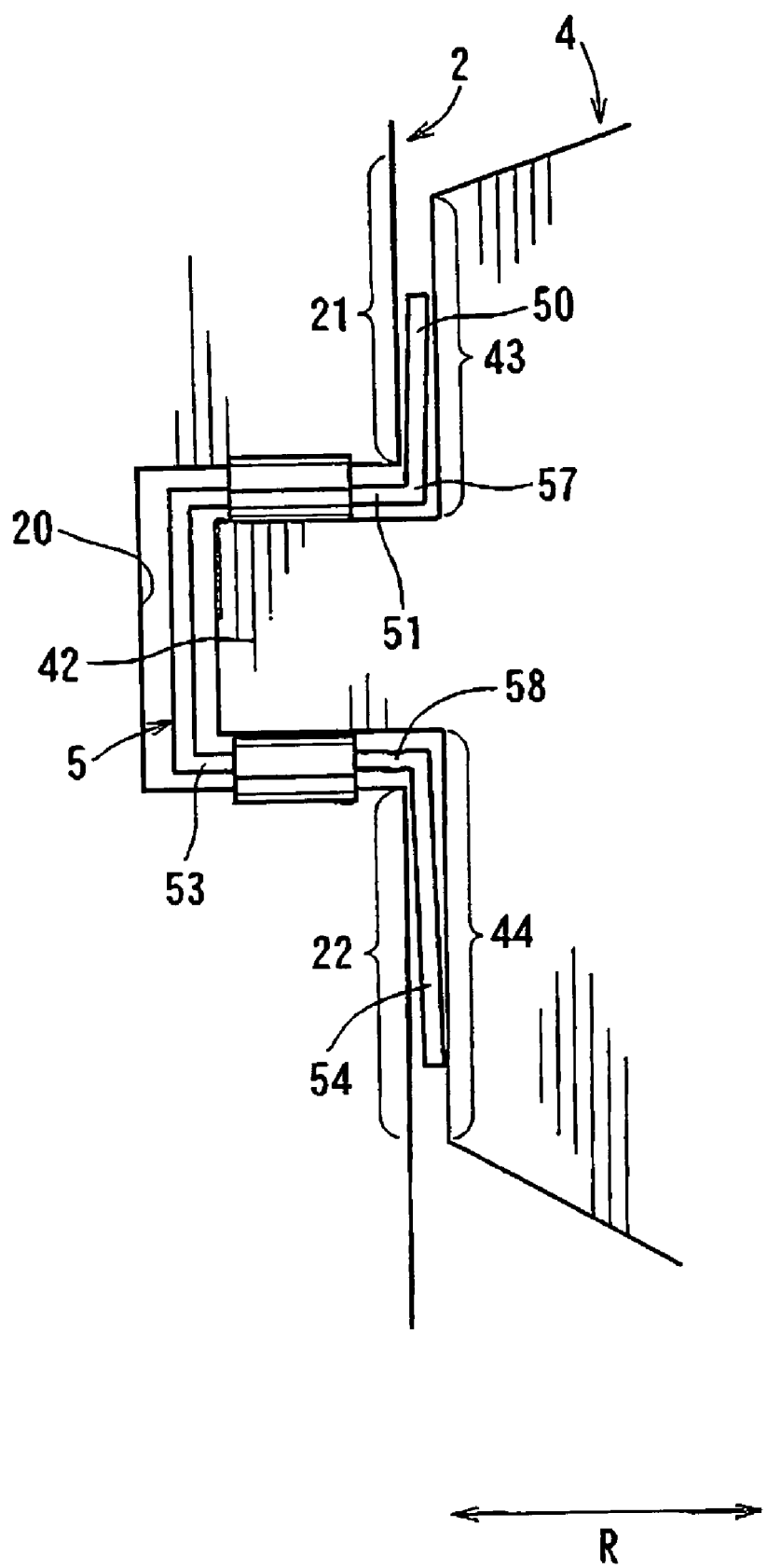
FIG. 14 is a cross sectional view similar to FIG. 13 but showing the state where the pad is not received a rotational force by a brake disk.
Figure 15:
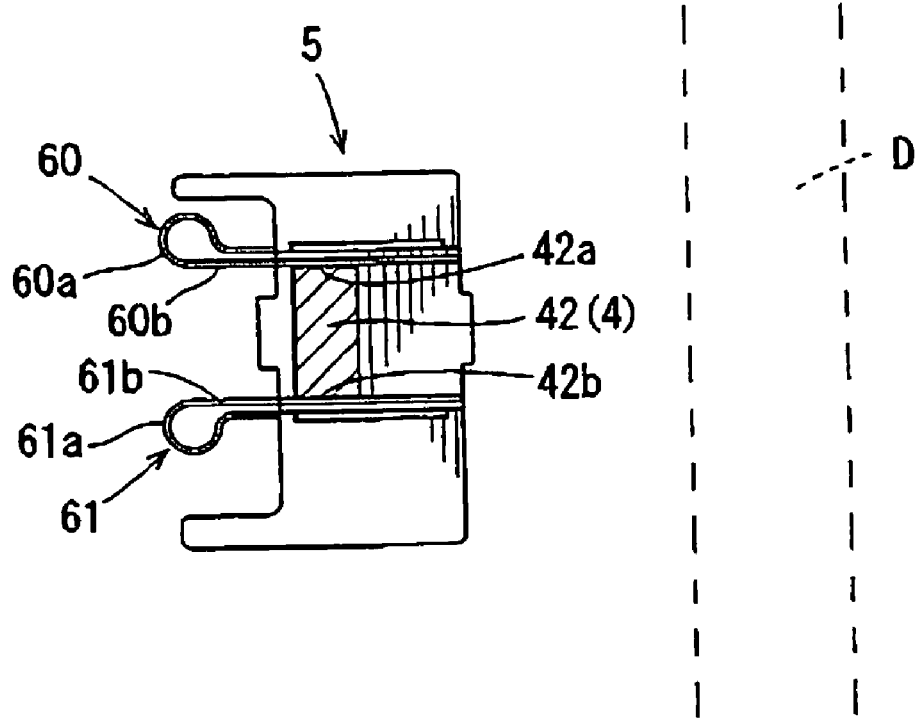
FIG. 15 is a cross sectional view taken along line XV—XV in FIG. 10.
Figure 16:
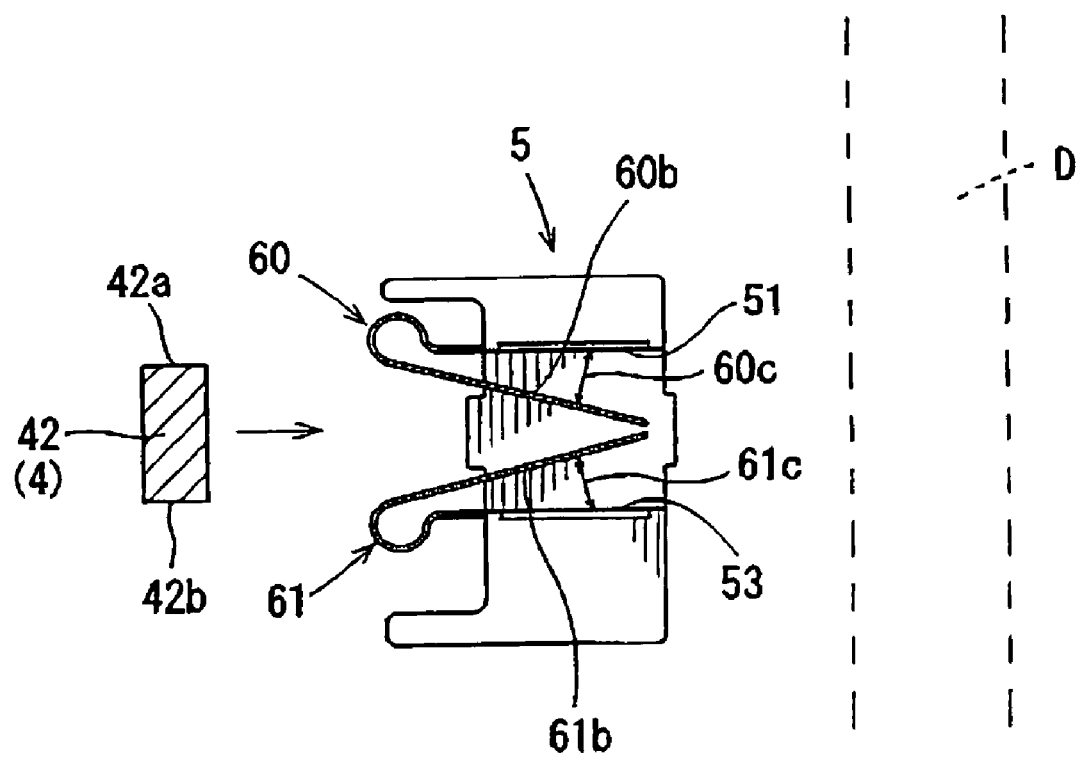
FIG. 16 is a view similar to FIG. 15 but showing the operation for inserting a guide portion into the support member.

The operation of the fourth representative embodiment will be described with reference to FIGS. 13 and 14 in connection with a braking operation in which the pads 4 are pressed against the brake disk D under a low load (a low hydraulic pressure force braking operation).

As described previously, when the pads 4 are pressed against the brake disk D, frictional forces may be produced between the pads 4 and the brake disk D, causing the pads 4 to move in a rotational direction R of the brake disk D (see FIG. 13). As a result, the pressure receiving portions 43 and 44 of each pad 4 respectively receives reaction forces from the support surfaces 21 and 22, via the support member 5.

In some situations, support members 5, the pads 4, and the mount 2, may have large tolerances in sizes or dimensions caused during the manufacturing operations. Therefore, as shown in FIG. 14, a clearance may be produced between the support member 5 and the guide portion 42. A clearance may also be produced between the support member 5 and the support portion 20. However, according to the fourth representative embodiment, joint regions 57 and 58 facilitate the resilient deformation of the support member 5. When the pressure receiving section 50 (54) receives a pressing force from the pad 4, the pressure receiving section 50 (54) can easily pivot about the joint region 57 (58) relative to the insertion section 51 (53). As a result, the pressure receiving section 50 (54) may pivot to a suitable angular position such that the pressure receiving section 50 (54) closely contacts with both the pad 4 (pressure receiving portion 43 (44)) and the mount 2 (pressure receiving surface 21 (22)) in a surface-to-surface contact relationship as shown in FIG. 13.

As described above, according to the fourth representative embodiment, the joint region 57 (58) is provided for joining the pressure receiving section 50 (54) and the insertion section 51 (53) of each spring member 5. In particular, the joint region 57 (58) has the slotted portion 57a (58a) that provides an area of reduced rigidity to the joint region 57 (58) in order to facilitate the resilient deformation allowing a pivotal movement. Therefore, the pressure receiving section 50 (54) can easily pivot relative to the insertion section 51 (53) about the joint region 57 (58).

As a result, in response to the configurations of the pad 4 (pressure receiving portion 43 (44)) and the mount 2 (pressure receiving surface 21 (22)), the pressure receiving section 50 (54) may suitably pivot to closely contact the pad 4 and the mount 2 in a surface-to-surface contact relationship as shown in FIG. 13. This may prevent or minimize the generation of an audible squealing sounds of the pads 4.

Further, the joint region 57 (58) has the slotted portion 57a (58a) and a pair of the bridging portions 57b and 57c (58b and 58c). The bridging portions 57b and 57c (58b and 58c) are positioned on either side of the slotted portion 57a (58a) (i.e., the side proximal to the brake disk D and the side away from the brake disk D) and are aligned with each other along the axial direction of the brake disk D in order to connect the pressure receiving section 50 (54) and the insertion section 51 (53). Therefore, the bridging portions 57b and 57c (58b and 58c) may reliably prevent the pressure receiving section 50 (54) and the insertion section 51 (53) from being twisted relative to each other. As a result, the pressure receiving section 50 (54) can reliably and stably pivot relative to the insertion section 51 (53). Even if the pressure receiving section 50 (54) and the insertion section 51 (53) have been twisted relative to each other, the twisting force may be dispersed when received by the two bridging portions 57b and 57c (58b and 58c). Therefore, the bridging portions 57b and 57c (58b and 58c) can reliably resist the twisting force so that damages to the bridging portions 57b and 57c (58b and 58c) can be avoided or minimized.

Furthermore, according to the fourth representative embodiment, the support member 5 has two pressure receiving sections, 50 and 54, two insertion sections, 51 and 53, and two joint regions, 57 and 58, as shown in FIG. 11. In addition, the joint regions 57 and 58 have their respective slotted portions 57a and 58a. Therefore, the pressure receiving sections 50 and 54 can independently pivot about their respective joint regions 57 and 58 to closely contact with the pad 4 and the mount 2 as shown in FIG. 13. As a result, the generation of audible squealing sounds of the pads 4 can be further reduced or minimized.

In particular, each of the pressure receiving sections 50 and 54 can independently pivot to closely contact with the pad 4 and the mount 2. This allows the pressure receiving portions 43 and 44 to suitably receive the reaction forces from the mount via the respective pressure receiving sections 50 and 54 of the support member 5.

Fifth Representative Embodiment

Figure 17:
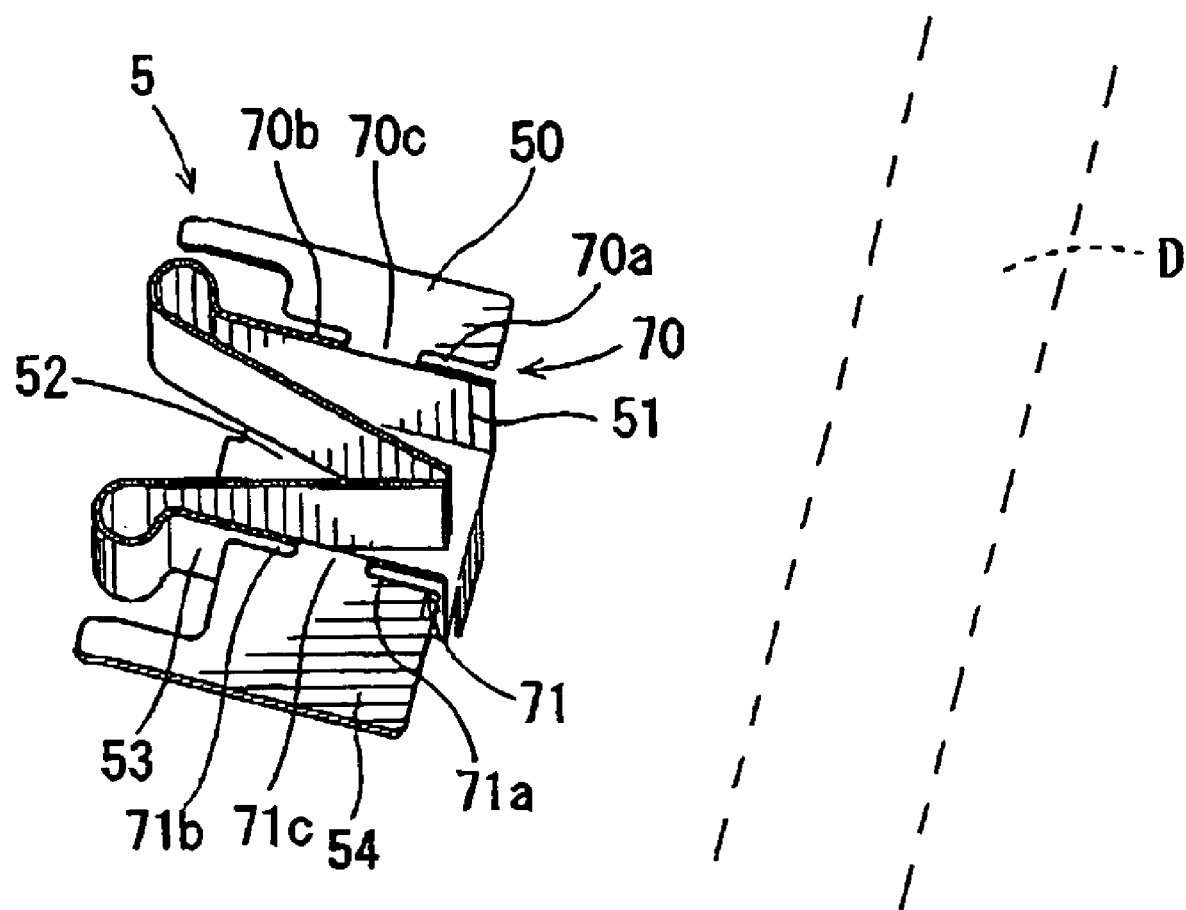
FIG. 17 is a perspective view of a support member of a fifth representative disk brake device.

A fifth representative embodiment will now be described with reference to FIG. 17. The fifth representative embodiment relates to a modification of each support member 5 of the fourth representative embodiment The support member 5 of the fifth representative embodiment is different from the support member 5 of the fourth embodiment primarily in that the joint regions 57 and 58 are respectively replaced with joint regions 70 and 71, as shown in FIG. 17. In other respect, the support member 5 of the fifth representative embodiment is the same as the support member 5 of the fourth representative embodiment.

As shown in FIG. 17, similar to the support member 5 of the fourth representative embodiment, each of the support members 5 of the fifth representative embodiment is made of a spring plate and has an integral structure including a pair of the pressure receiving sections, 50 and 54, a pair of the insertion sections, 51 and 53, the joint section 52, and a pair of resiliently deformable sections, 60 and 61.

The pressure receiving section 50 and the insertion section 51 are joined to each other via the joint region 70. The pressure receiving section 54 and the insertion section 53 are joined to each other via the joint region 71. The joint region 70 has a pair of slotted portions 70a and 70b and a bridging portion 70c. The slotted portions 70a and 70b serve as portions for facilitating the pivoting movement at the joint region 70 and are preferably configured as elongated slots positioned on either side of the bridging portion 70c. The slotted portion 70a is positioned on the side proximally to the brake disk D and has an open end on this side. The slotted portion 70b is positioned on the side away from the brake disk D and has an open end on the corresponding portion of this side. The bridging portion 70c is positioned substantially centrally of the joint region 70 in the axial direction of the brake disk D. Similarly, the joint region 71 has a pair of slotted portions 71a and 71b and a bridging portion 71c. The slotted portions 71a and 71b serve as portions for facilitating the pivoting movement at the joint region 71 and are preferably configured as elongated slots positioned on both sides of the bridging portion 71c. The slotted portion 71a is positioned on the side proximally to the brake disk D and has an open end on this side. The slotted portion 71b is positioned on the side away from the brake disk D and has a corresponding open end on this side. The bridging portion 71c is positioned substantially centrally of the joint region 71 in the axial direction of the brake disk D.

The rigidness of the joint region 70 (71) is reduced by the provision of the slotted portions 70a and 70b (71a and 71b) in comparison to the remainder of the support member 5. When a force is applied to bend the pressure receiving region 50(54) and the insertion region 51(53) relative to one another, the bending force may be concentrated to the bridging portion 70c (71c), causing an increase in the stress applied to the bridging portion 70c (71c). As a result, the bending force can easily resiliently deform the bridging portion 70c (71c).

Sixth Representative Embodiment

Figure 18:
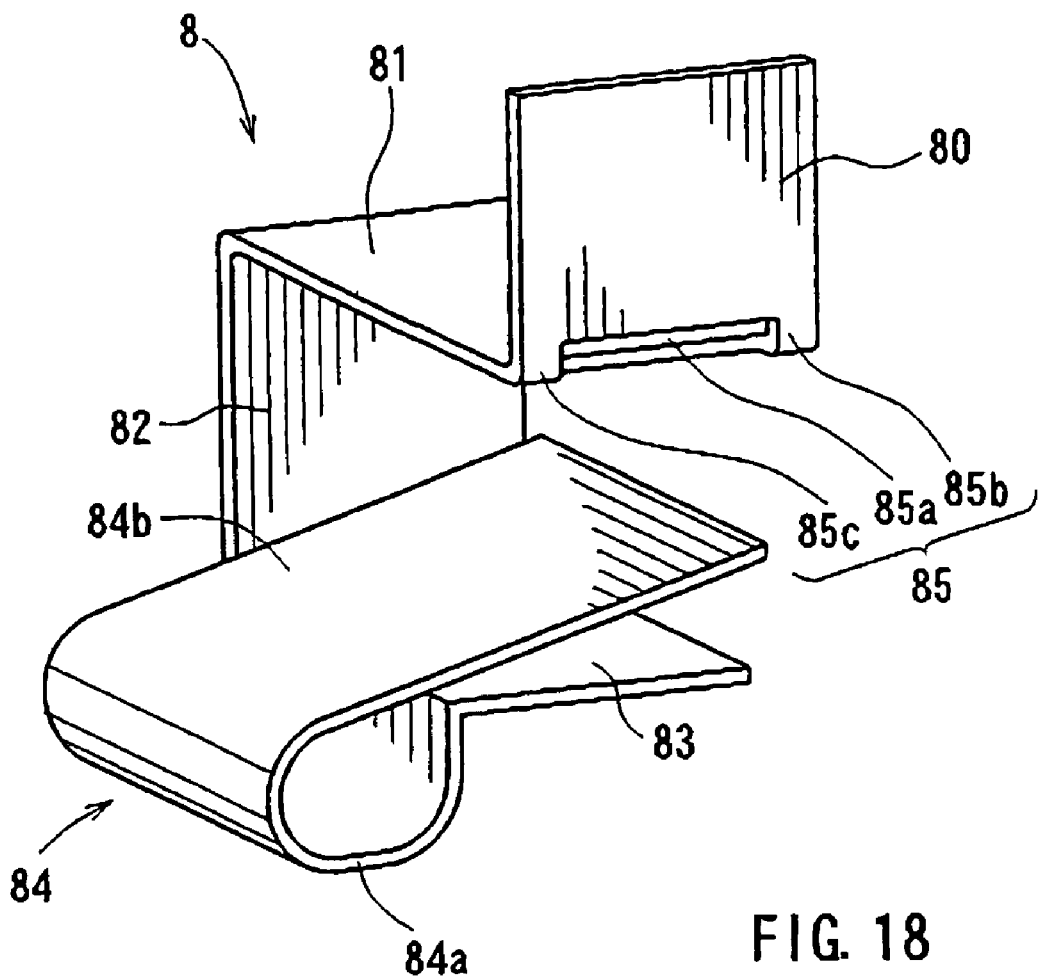
FIG. 18 is a perspective view of a support member of a sixth representative disk brake device.

A sixth representative embodiment will now be described with reference to FIGS. 18 to 21. The sixth representative embodiment relates to a modification of the fourth representative embodiment. The sixth representative embodiment is different than the fourth representative embodiment in that each of support members 8 (only one support member 8 is shown in the drawings) has a single pressure receiving section 80 and a single resiliently deformable section 84, as shown in FIG. 18. In addition, as shown in FIG. 20, the guide portions 42 (only one guide portion 42 is shown in FIG. 20) of each pad 4 are located at a different position from the guide portions 42 of the fourth representative embodiment (see FIG. 10). Therefore, the sixth representative embodiment will be described mainly in connection with the constructions that are different from the fourth representative embodiment Referring to FIG. 18, the support member 8 is made of a spring plate and has an integral structure including an insertion section 81 and a joint section 82 in addition to the pressure receiving section 80 and the resiliently deformable section 84. The pressure receiving section 80 and the insertion section 81 are joined to each other via a joint region 85.

Figure 19:
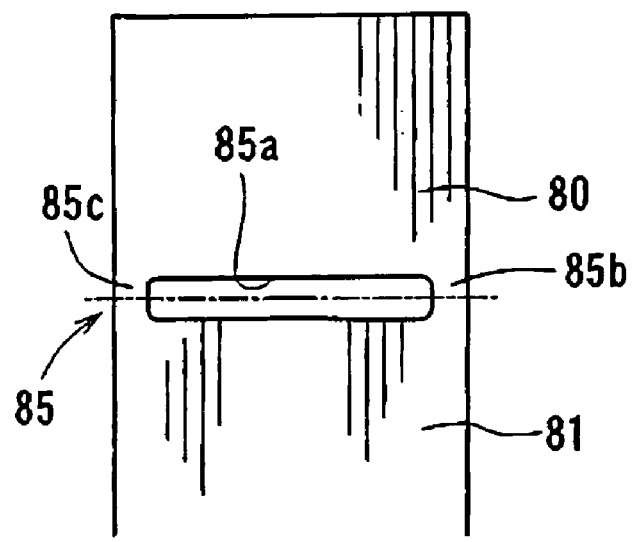
FIG. 19 is a view in developed form of a part around a joint region of the support member of the sixth representative disk brake device.
Figure 20:
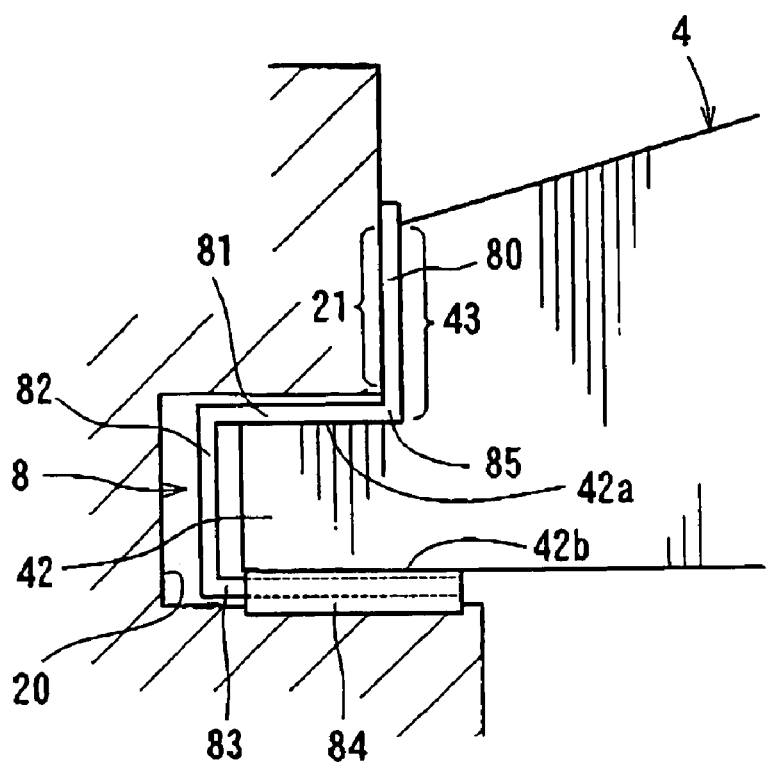
FIG. 20 is a cross sectional view similar to FIG. 13 but showing the sixth representative disk brake device.

As shown in FIGS. 18 and 19, the joint region 85 has a slotted portion 85a and a pair of bridging portions 85b and 85c. The slotted portion 85a serves as a portion for facilitating the pivoting movement at the joint region 85. The slotted portion 85a is positioned centrally of the joint region 85 and is preferably configured as an elongated slot. The bridging portion 85b is disposed at one end of the slotted portion 85a on the side proximal to the brake disk D and connects the pressure receiving section 80 and the insertion section 81. The bridging portion 85c is disposed at the other end of the slotted portion 85a on the side away from the brake disk D and also connects the pressure receiving section 80 and the insertion section 81. In the fitted state of the support member 8 shown in FIG. 20, the bridging portions 85b and 85c are aligned with each other along the axial direction of the brake disk D.

As shown in FIG. 18, the resiliently deformable section 84 has a curved part 84a and a linear part 84b. The curved part 84a extends from one side (the left side as viewed in FIG. 18) of the insertion section 83 in such a manner that the curved part 84a turns back toward the insertion section 83. The linear part 84b extends from the curved part 84a toward and along the insertion section 83 and is inclined relative to the insertion section 83 by a predetermined angle in an unloaded condition.

As shown in FIG. 20, in the sixth representative embodiment, the guide portions 42 is configured as a projection formed at each end of the pad 4 in the rotational direction of the brake disk D in the same manner as in the fourth representative embodiment. However, the guide portion 42 of the sixth representative embodiment is positioned radially inward with respect to the brake disk D. More specifically, the guide portion 42 is positioned at the radially inward end (lower end as viewed in FIG. 20) of the pad 4. In addition, the pad 4 of the sixth representative embodiment has only one pressure receiving portion 43. The pressure receiving portion 43 extends from the guide portion 42 in a radially outward direction of the brake disk D. No pressure receiving section is provided on the radially inner side of the guide portion 42. Conversely, the support portion 20 of the mount 2 is configured as a recess and is positioned to correspond to the position of the guide portion 42 as in the fourth embodiment However the mount 2 has only one support surface 21 on the radially outer side of the support portion 20. No support surface is formed on the radially inner side of the support portion 20.

Figure 21:
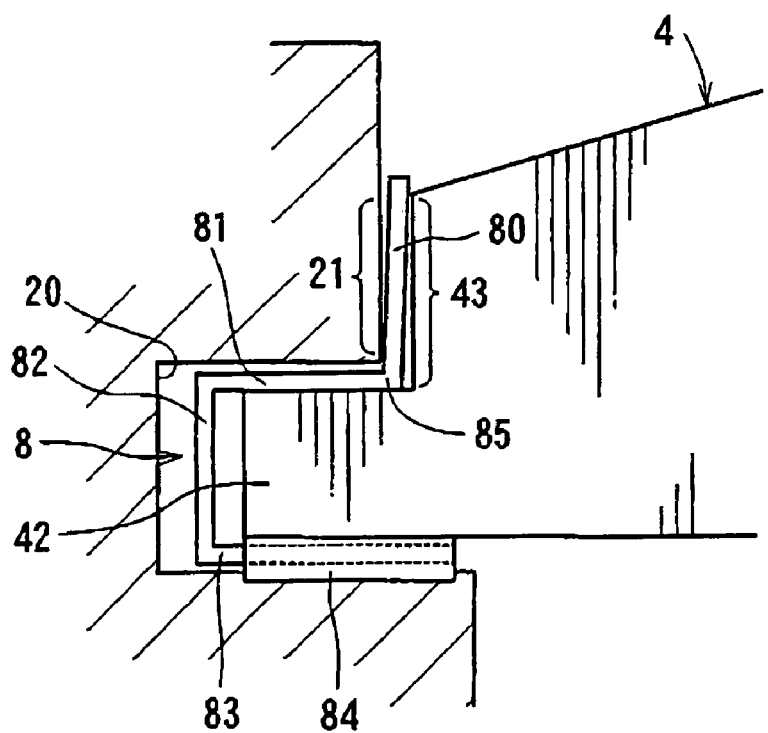
FIG. 21 is a cross sectional view similar to FIG. 14 but showing the sixth representative disk brake device.

The operation of the sixth representative embodiment will be described with reference to FIGS. 20 and 21 in connection with a braking operation in which the pads 4 are pressed against the brake disk D. When the pads 4 are pressed against the brake disk D, the pads 4 are force to move in the rotational direction R of the brake disk D (see FIG. 20). Therefore, the pressure receiving portion 44 of each pad 4 receives a reaction force from the support surface 21 of the mount 2 via the support member 8. As discussed previously in connection with the fourth representative embodiment, the support members 8, the pads 4, and the mount 2, may have large tolerances in sizes or dimensions caused during the normal manufacturing operations. Therefore, as shown in FIG. 21, a clearance may exist between the support member 8 and the guide portion 42. Also, a clearance may also exist between the support member 8 and the support portion 20. However, the joint region 85 facilitates resilient deformation of the support member 8. When the pressure receiving section 80 receives a pressing force from the pad 4, the pressure receiving section 80 can easily pivot about the joint region 85 relative to the insertion section 81. As a result, the pressure receiving section 80 may pivot to a suitable angular position in response to the configurations of the pad 4 (pressure receiving portion 43) and the mount 2 (pressure receiving surface 21) such that the pressure receiving section 80 closely contacts with the pad 4 and the mount 2 in a surface-to-surface contact relationship as shown in FIG. 20.

Seventh Representative Embodiment

A seventh representative embodiment will now be described with reference to FIGS. 22 and 23. The seventh representative embodiment relates to a modification of each support member 8 of the sixth representative embodiment. Each support member 8 of the seventh representative embodiment is different from each support member 8 of the sixth embodiment only in that the joint region 85 shown in FIG. 18 is replaced with a joint region 86 shown in FIG. 22. In all other respects, each support member 8 of the seventh representative embodiment is the same as each support member 8 of the sixth representative embodiment.

Figure 22:
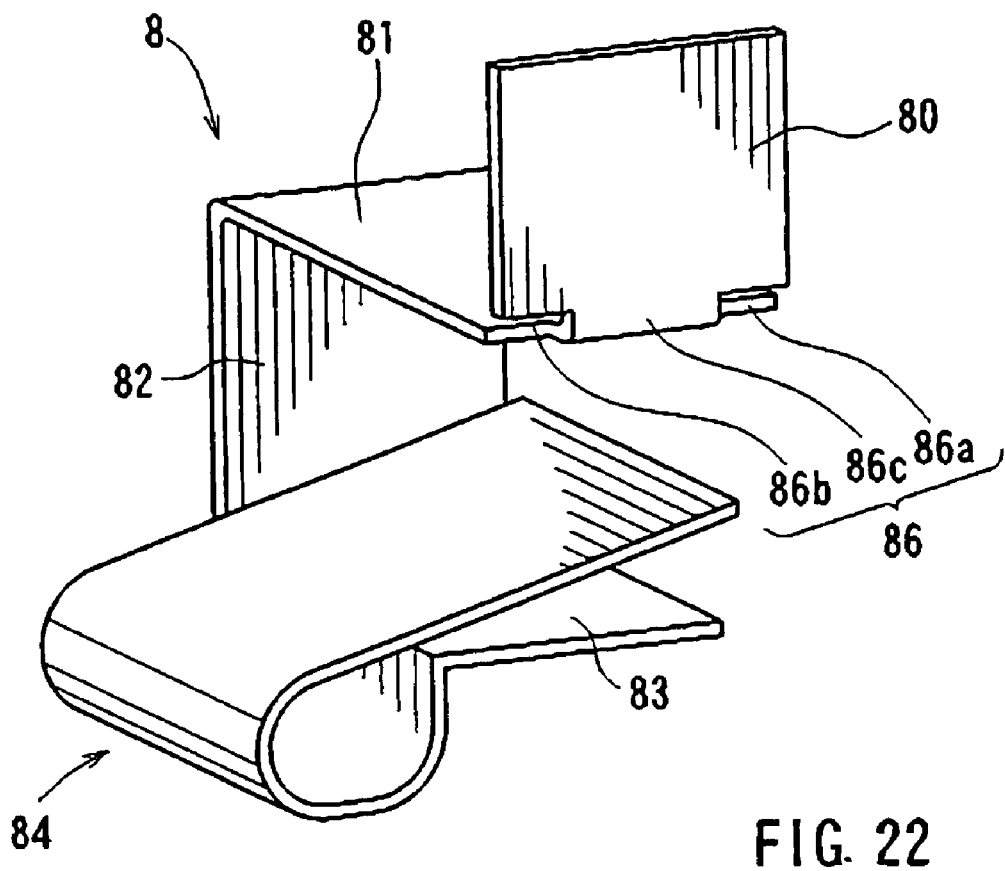
FIG. 22 is a perspective view of a support member of a seventh representative disk brake device.
Figure 23:
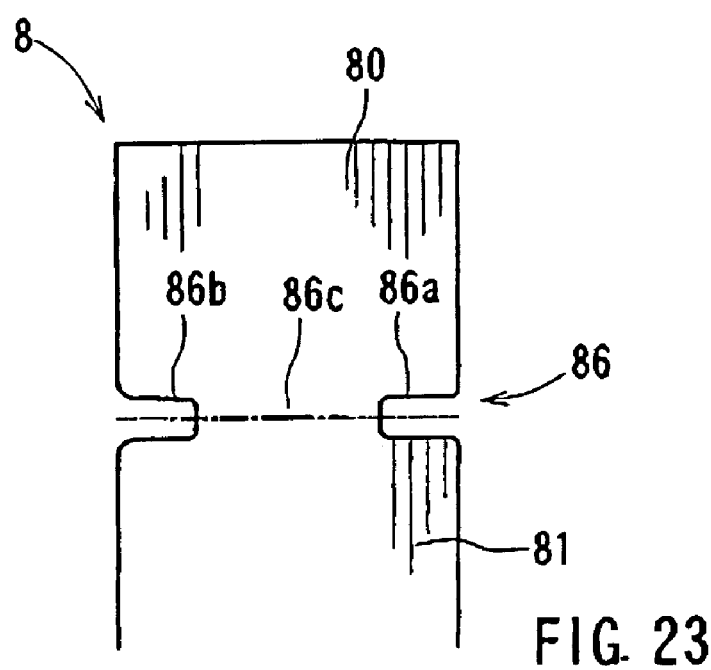
FIG. 23 is a view in developed form of a part around a joint region of the support member of the seventh representative disk brake device.

As shown in FIG. 22, similar to the support member 8 of the sixth representative embodiment, the support member 8 is made of a spring plate and has an integral structure including the pressure receiving section 80, the insertion section 81, the joint section 82, and the resiliently deformable section 84

The pressure receiving section 80 and the insertion section 81 are joined to each other via the joint region 86. The joint region 86 has a pair of slotted portions, 86a and 86b, and a bridging portion 86c. The slotted portions 86a and 86b. serve as portions for facilitating the pivoting movement at the joint region 86 and are preferably configured as elongated slots positioned on either side of the bridging portion 86c. The slotted portion 86a is positioned on the side proximally to the brake disk D and has an open end on this side. The slotted portion 86b is positioned on the side away from the brake disk D and has a corresponding open end on this side. The bridging portion 80c is positioned substantially centrally of the joint region 86 in the axial direction of the brake disk D.

The rigidness of the joint region 86 is reduced by the provision of the slotted portions 86a and 86b. When a force is applied to bend the pressure receiving region 80 and the insertion region 81 relative to each other, the bending force may be concentrated in the bridging portion 86c, so that the stress applied to the bridging portion 86c increases. As a result, the bending forces can easily resiliently deform the bridging portion 86c.

(Possible Alternative Arrangements of First to Seventh Representative Embodiments)

(1) Although the guide portion is configured as a projection and the support portion is configured as a recess in the above representative embodiments, this arrangement may be reversed such that the guide portion is configured as a recess and the support portion is configured as a projection.

(2) Although the guide portion and the pressure receiving portion(s) are provided on both ends of each pad along the rotational direction of the brake disk in the above representative embodiments, the guide portion and the pressure receiving portion(s) may be provided on only one end of each pad in the normal or predominant rotational direction of the brake disk, i.e., the rotational direction during the forward movement of an automobile.

(3) Although spring plates configure the resiliently deformable sections of the second and fourth to seventh representative embodiments, the resiliently deformable sections may be replaced with wire springs, or elastic materials such as rubber or plastics having elasticity.

(4) Although in the second to seventh representative embodiments, the resiliently deformable sections are configured to bias the guide portion in an oblique direction (in order to apply forces both in the radial direction of the brake disk and in the axial direction of the brake disk away from the brake disk); any other arrangement may be incorporated. For example, an inclined surface inclined toward the brake disk may be formed on the guide portion and the resiliently deformable section may apply the biasing force against the guide portion via the inclined surface. In the case of the second to fifth representative embodiments, such inclined surfaces may be formed on both the radially outer surface 42a and the radially inner surface 42b of the guide portion 42. By suitably setting the inclination angles of the inclined surfaces, the pad 4 may be biased such that the radially outer side of the pad is biased by a larger force in the direction away from the brake disk than the radially inner side.

(5) In the second to seventh representative embodiments, the support members (including the resiliently deformable sections) have been described in connection with floating-type disk brake devices. However, the support members (including the resiliently deformable sections) also may be applied to different types of disk brake devices, such as an opposing-type disk brake devices.

(6) In the fourth to seventh representative embodiments, the joint regions have slotted portions in order to facilitate the pivotal movement. However, the slotted portions may be replaced with portions having a thin thickness or potions configured as bottomed recesses.

(7) In the fourth and fifth representative embodiments, the support member has two joint regions each having the slotted portion(s). However, the slotted portion(s) may be formed in only one of the joint regions. Also with this arrangement, the pressure receiving sections can be facilitated to pivot relative to the pad in order to closely contact with the pad and the mount.

The invention claimed is:

1. A disk brake device comprising:
 a rotary brake disk having a rotational direction and an axial direction;
 at least one pad having a guide portion disposed on one end of the pad in the rotational direction of the brake disk;
 a mount having a support portion arranged and constructed to slidably support the guide portion, so that the pad can move in the axial direction of the brake disk;
 a radially outer pressure receiving surface and a radially inner pressure receiving surface formed on at least one end of each of the at least one pad in the rotational direction of the brake disk and arranged and constructed to receive a reaction force from the mount in order to inhibit the pad from moving in the rotational direction of the brake disk when the at least one pad is subjected to a force in the rotational direction of the brake disk;
 a radially outer support surface and a radially inner support surface respectively corresponding to the radially outer pressure receiving surface and the radially inner pressure receiving surface;
 wherein the radially outer pressure receiving surface and the radially inner pressure receiving surface are respectively disposed on a radially outer side and a radially inner side with respect to the brake disk of the guide portion;
 wherein an interaction between the radially outer support surface and the radially outer pressure receiving surface generates a radially outer portion of the reaction force from the mount;
 wherein an interaction between the radially inner support surface and the radially inner pressure receiving surface generates a radially inner portion of the reaction force from the mount;
 wherein the radially outer portion of the reaction force and the radially inner portion of the reaction force are each greater than zero when the at least one pad is subjected to a force in the rotational direction of the brake disk;
 a biasing device disposed between the guide portion and the support portion, wherein the biasing device biases the guide portion in a radially inner direction and a radially outer direction; and wherein the biasing device also biases the guide portion in an axial direction away from the brake disk.

2. The disk brake device as in claim 1, wherein the biasing device biases the guide portion in the axial direction from both sides of the guide portion, wherein the axial direction biasing force applied to the guide portion from the radially outer side is larger than the axial direction biasing force applied to the guide portion from the radially inner side.

3. The disk brake device as in claims 1, wherein the biasing device comprises at least one resiliently deformable member.

4. The disk brake device as in claim 1, further comprising a support member disposed between the guide portion and the support portion, wherein the guide portion and the support portion are prevented from directly contacting with each other due to the support member.

5. The disk brake device as in claim 4, wherein the support member is formed integrally with the biasing device.

6. The disk brake device as in claim 4, wherein the support member comprises:

at least one pressure receiving section interposed between the mount and at least one of the radially outer pressure receiving surface or the radially inner pressure receiving surface of the at least one pad;

wherein the at least one pressure receiving section is clamped between the at least one pad and the mount when the at least one pad is forced in the rotational direction of the brake disk; and at least one insertion section disposed between the guide portion and the support portion and extending from the at least one pressure receiving section in the rotational direction of the brake disk;

wherein the at least one pressure receiving section and the at least one insertion section are joined to each other via a joint region.

7. The disk brake device as in claim 6, wherein the at least one pressure receiving section, the at least one insertion section and the joint region are formed integrally with each other.

8. The disk brake device as in claim 6, wherein the at least one pressure receiving section and the at least one insertion section are resiliently pivotable relative to each other about the joint region.

9. The disk brake device as in claim 8, wherein the joint region comprises a rigidness reduced portion in order to facilitate a pivoting movement.

10. The disk brake device as in claim 9, wherein the rigidness reduced portion comprises at least one slotted portion formed in the joint region.

11. The disk brake device as in claim 1, wherein one of the guide portion and the support portion is configured as a projection and the other of the guide portion and the support portion is configured as a recess for receiving the projection, and wherein a clearance is defined between the projection and the recess in order to permit the at least one of the radially outer pressure receiving surface and the radially inner pressure receiving surface to contact with the mount prior to causing locking of the projection and the recess when the pad is tilted in the rotational direction of the brake disk.

12. A disk brake device comprising:

a rotary brake disk having a rotational direction, a radial direction, and an axial direction;

a mount;

two pads opposing each other in the axial direction via the brake disk;

wherein each end in the rotation direction of each corresponding one of the two pads comprises:

a guide portion;

an outer pressure receiving surface with respect to the guide portion in the radial direction;

an inner pressure receiving surface with respect to the guide portion in the radial direction;

wherein the outer pressure receiving surface and the inner pressure receiving surface are arranged and constructed to respectively receive an outer reaction force and an inner reaction force from the mount in order to inhibit the corresponding pad from moving in the rotational direction of the brake disk when the corresponding pad is subjected to a force in the rotational direction of the brake disk;

the mount comprising:

a plurality of support portions corresponding to the guide portions;

a plurality of outer support surfaces corresponding to the outer pressure receiving surfaces;

a plurality of inner support surfaces corresponding to the inner pressure receiving surfaces;

wherein each of the plurality of support portions is arranged and constructed to slidably support a corresponding guide portion so that the corresponding pad is movable in the axial direction;

a support member corresponding to each of the plurality of support portions;

wherein each of the support members comprises a biasing device;

wherein an interaction between the radially outer support surface and the radially outer pressure receiving surface generates the radially outer reaction force;

wherein an interaction between the radially inner support surface and the radially inner pressure receiving surface generates the radially inner reaction force;

wherein the support portion slidingly supports the corresponding guide member via the corresponding support member;

wherein the biasing device of the support member biases the corresponding guide portion in a radially inner direction and a radially outer direction with respect to the radial direction; and wherein the biasing device further biases the corresponding guide portion in an axial direction away from the brake disk.

13. The disk brake device of claim 12, wherein the support member further comprises:

a pressure receiving section interposed between at least one of the outer pressure receiving surface or the inner pressure receiving surface of each corresponding one of the two pads and the corresponding outer support portion or the corresponding inner support portion;

wherein at least one of the interactions between the outer pressure receiving surface and the outer support portion or between the inner pressure receiving surface and the inner support portion, occurs via the at least one pressure receiving surface.

14. The disk brake device of claim 12, wherein the support member comprises:

a pressure receiving section resiliently interposed between the corresponding outer pressure receiving surface and the corresponding inner pressure receiving surface of each corresponding one of the two pads and the corresponding outer support portion and the corresponding inner support portion;

wherein each of the interactions between the outer pressure receiving surface and the outer support portion, and between the inner pressure receiving surface and the inner support portion, occurs via the corresponding pressure receiving surface.

\* \* \* \* \*